United States Patent
Xiao et al.

(10) Patent No.: US 11,843,462 B2
(45) Date of Patent: Dec. 12, 2023

(54) METHOD FOR GENERATING HYBRID AUTOMATIC REPEAT REQUEST HARQ INFORMATION AND APPARATUS

(71) Applicant: HUAWEI TECHNOLOGIES CO., LTD., Guangdong (CN)

(72) Inventors: Jiehua Xiao, Shenzhen (CN); Jinlin Peng, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 421 days.

(21) Appl. No.: 17/129,397

(22) Filed: Dec. 21, 2020

(65) Prior Publication Data
US 2021/0135793 A1 May 6, 2021

Related U.S. Application Data

(63) Continuation of application No. PCT/CN2019/092190, filed on Jun. 21, 2019.

(30) Foreign Application Priority Data

Jun. 22, 2018 (CN) .......................... 201810654342.3

(51) Int. Cl.
*H04L 1/18* (2023.01)
*H04W 72/04* (2023.01)
(Continued)

(52) U.S. Cl.
CPC .......... *H04L 1/1812* (2013.01); *H04L 1/1861* (2013.01); *H04W 72/0453* (2013.01)

(58) Field of Classification Search
CPC ... H04W 28/04; H04W 72/04; H04W 72/042; H04W 88/08; H04W 72/0453; H04L 5/0007; H04L 1/1812; H04L 1/1861
(Continued)

(56) References Cited

U.S. PATENT DOCUMENTS

2013/0114524 A1* 5/2013 Sirotkin ................ H04B 7/024
370/328
2013/0182789 A1 7/2013 Ko et al.
(Continued)

FOREIGN PATENT DOCUMENTS

| CN | 107889253 A | * | 4/2018 | ............... H04L 5/00 |
| CN | 107889253 A | | 4/2018 | |

(Continued)

OTHER PUBLICATIONS

3GPP TSG RAN WG1 Meeting #92, Athens, Greece, Feb. 26-Mar. 2, 2018, R1-1801989, Agenda item: 7.1.3.4.2, Source: Samsung, Title: Corrections on CA operation. (Year: 2018).*
(Continued)

*Primary Examiner* — Peter G Solinsky
*Assistant Examiner* — Sanjay K Dewan
(74) *Attorney, Agent, or Firm* — Fish & Richardson P.C.

(57) ABSTRACT

This application provides a method for generating hybrid automatic repeat request HARQ information and an apparatus. The method includes: A terminal device receives a first message sent by a network device. The first message is used to indicate that there is a bandwidth part BWP combination in a cell, the BWP combination includes an active BWP, and the BWP corresponds to a set of unified parameters. The terminal device generates HARQ information based on the unified parameters corresponding to the BWP combination. This application provides a method for generating HARQ information when there are a plurality of active BWPs.

18 Claims, 13 Drawing Sheets

(51) Int. Cl.
*H04L 1/1812* (2023.01)
*H04L 1/1829* (2023.01)
*H04W 72/0453* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 2015/0282146 | A1* | 10/2015 | Nigam | H04L 1/1861 |
| | | | | 370/329 |
| 2015/0358126 | A1* | 12/2015 | Yin | H04L 5/1469 |
| | | | | 370/329 |
| 2019/0075585 | A1* | 3/2019 | Deogun | H04W 72/23 |
| 2019/0132110 | A1* | 5/2019 | Zhou | H04W 76/38 |
| 2019/0149213 | A1* | 5/2019 | Zhou | H04L 5/0092 |
| | | | | 370/329 |
| 2019/0149275 | A1* | 5/2019 | He | H04L 65/1016 |
| | | | | 370/329 |
| 2020/0053777 | A1* | 2/2020 | Babaei | H04W 16/14 |

FOREIGN PATENT DOCUMENTS

| | | | | |
|---|---|---|---|---|
| CN | 108093481 A | 5/2018 | | |
| CN | 108112080 A | 6/2018 | | |
| CN | 3 787 211 A1 * | 3/2021 | ............... | H04L 5/00 |
| EP | 3787211 A1 | 3/2021 | | |
| WO | 2018085145 A1 | 5/2018 | | |
| WO | WO 2018/085145 A1 * | 5/2018 | ............... | H04L 5/00 |

OTHER PUBLICATIONS

3GPP TSG RAN WG1 Meeting #91, Reno, USA, Nov. 27-Dec. 1, 2017, R1-1719828, Agenda Item: 7.3.6, Source: Huawei, HiSilicon, Title: Bandwidth part activation and adaptation. (Year: 2017).*
3GPP TSG RAN WG1 Meeting #93, Busan, Korea, May 21-25, 2018, R1-1807138, Agenda Item: 7.1.3.3.7, Source: Huawei, HiSilicon, Title: Discussion on semi-static HARQ-ACK codebook when slot aggregation for UCI reliability. (Year: 2018).*
Extended European Search Report issued in European Application No. 19823600.2 dated Jul. 1, 2021, 11 pages.
Huawei et al., "Bandwidth part activation and adaptation," 3GPP TSG RAN WG1 Meeting #91, R1-1719828, Reno, USA, Nov. 27-Dec. 1, 2017, 6 pages.
Samsung, "Corrections on CA operation," 3GPP TSG RAN WG1 Meeting #92, R1-1801989, Athens, Greece, Feb. 26- Mar. 2, 2018, 9 pages.
3GPP TS 38.213 V15.1.0 (Mar. 2018), "3rd Generation Partnership Project; Technical Specification Group Radio Access Network; NR; Physical layer procedures for control (Release 15)," Mar. 2018, 77 pages.
Huawei et al., "Discussion on semi-static HARQ-ACK codebook when slot aggregation for UCI reliability", 3GPP TSG RAN WG1 Meeting #93, R1-1807138, Busan, Korea, May 21-25, 2018, 8 pages.
Office Action in Chinese application No. 201810654342.3, dated Apr. 15, 2020, 12 pages.
Search Report in Chinese Application No. 201810654342.3, dated Apr. 8, 2020. 2 pages.
PCT International Search Report and Written Opinion in International Application No. PCT/CN2019/092190, dated Sep. 27, 2019, 17 pages.

* cited by examiner

METHOD FOR GENERATING HYBRID AUTOMATIC REPEAT REQUEST HARQ INFORMATION AND APPARATUS

CROSS-REFERENCE TO RELATED APPLICATIONS

This application is a continuation of International Application No. PCT/CN2019/092190, filed on Jun. 21, 2019, which claims priority to Chinese Patent Application No. 201810654342.3, filed on Jun. 22, 2018. The disclosures of the aforementioned applications are hereby incorporated by reference in their entireties.

TECHNICAL FIELD

This application relates to the communications field, and more specifically, to a method for generating hybrid automatic repeat request HARQ information and an apparatus.

BACKGROUND

In a current communications system, after receiving data sent by a transmit end, a receive end needs to send, to the transmit end, hybrid automatic repeat request (hybrid automatic repeat reQuest, HARQ) feedback information determined based on a decoding result. When the receive end fails to perform decoding, the transmit end needs to retransmit the data based on the HARQ feedback information.

With evolution of technologies, a concept of a bandwidth part (bandwidth part, BWP) is introduced. A BWP is a group of consecutive resource block (resource block, RB) resources on a carrier. Different BWPs may occupy frequency domain resources that partially overlap but have different bandwidths, or may occupy frequency domain resources that do not overlap in frequency domain. In this case, after the BWP is introduced, a retransmission mechanism urgently needs to be updated.

SUMMARY

This application provides a method and an apparatus for generating hybrid automatic repeat request HARQ information, so that when a serving cell is extended and includes a plurality of active bandwidth parts, and the plurality of active bandwidth parts may be located on a same carrier in the cell, or may be located on different carriers in the cell, a manner of generating a HARQ codebook is provided.

According to a first aspect, a method for generating hybrid automatic repeat request HARQ information is provided. The method includes: A terminal device receives a first message sent by a network device. The first message is used to indicate that there is a bandwidth part BWP combination in a cell, and the BWP combination includes an active BWP. The terminal device generates HARQ information based on a parameter corresponding to the BWP combination.

Based on the foregoing technical solution, there may be a plurality of active BWPs in one serving cell (namely, an example of a cell). When the network device configures a plurality of active BWPs for the terminal device, where the plurality of active BWPs may be considered as one BWP combination, and the BWP combination corresponds to one set of unified parameters, the network device may send, to the terminal device, information indicating the BWP combination, and then the terminal device generates the HARQ information based on the parameters corresponding to the BWP combination.

With reference to the first aspect, in some implementations of the first aspect, at least two active BWPs in the BWP combination are used to transmit a same transport block.

Based on the foregoing technical solution, the at least two active BWPs included in the BWP combination may be used to transmit the same transport block. For example, the at least two active BWPs may respectively carry different parts of a same encoded transport block, or the at least two active BWPs may respectively carry different data obtained after a same transport block is encoded by using different redundancy versions.

With reference to the first aspect, in some implementations of the first aspect, a plurality of active BWPs in the BWP combination are located on different carriers of the cell.

Based on the foregoing technical solution, the plurality of active BWPs in the BWP combination may be located on different carriers of a same cell.

With reference to the first aspect, in some implementations of the first aspect, that the terminal device generates HARQ information based on a parameter corresponding to the BWP combination includes: The terminal device determines, based on the parameter corresponding to the BWP combination, a physical downlink shared channel PDSCH receiving occasion set corresponding to the BWP combination. The terminal device generates the HARQ information based on the PDSCH receiving occasion set corresponding to the BWP combination.

Based on the foregoing technical solution, the terminal device may determine, based on the parameter corresponding to the BWP combination, the PDSCH receiving occasion set corresponding to the BWP combination, and then generate the HARQ information based on the PDSCH receiving occasion set.

With reference to the first aspect, in some implementations of the first aspect, the parameter corresponding to the BWP combination includes a parameter corresponding to at least one of the plurality of active BWPs, or a predefined parameter.

Based on the foregoing technical solution, the parameter corresponding to the BWP combination may be a parameter corresponding to any active BWP included in the BWP combination, or may be a set of parameters corresponding to some or all active BWPs included in the BWP combination, or may be a parameter preconfigured by the network device for the BWP combination.

With reference to the first aspect, in some implementations of the first aspect, the method further includes: The terminal device obtains a quantity of frequency domain positions of a plurality of BWP combinations based on a slot timing value K1 value set, first determines PDSCH receiving occasion sets corresponding to the plurality of BWP combinations for each K1 value, and then determines all PDSCH receiving occasion sets corresponding to the plurality of BWP combinations for all K1 values in the K1 value set; or the terminal device obtains a K1 value set based on frequency domain positions of a plurality of BWP combinations, first determines a PDSCH receiving occasion set corresponding to a frequency domain position of each BWP combination in the K1 value set, and then determines PDSCH receiving occasion sets corresponding to the plurality of BWP combinations; or the terminal device obtains, based on frequency domain positions of a plurality of BWP combinations, a first PDSCH receiving occasion set corresponding to the plurality of BWP combinations, and obtains, based on parameters corresponding to the plurality of BWP combinations, a second PDSCH receiving occasion set corresponding to the plurality of BWP combinations, and the terminal device determines, based on a combination of the first PDSCH receiving occasion set and the second PDSCH receiving occasion set, PDSCH receiving occasion sets corresponding to the plurality of BWP combinations. The K1 value set is any one of the following: a K1 value set corresponding to at least one active BWP in the plurality of BWP combinations, a K1 value set corresponding to at least one of the plurality of BWP combinations, and a predefined K1 value set. That the terminal device generates HARQ information based on a parameter corresponding to the BWP combination includes: The terminal device generates the HARQ information based on the PDSCH receiving occasion sets corresponding to the plurality of BWP combinations.

Based on the foregoing technical solution, the network device may indicate the plurality of BWP combinations to the terminal device. In this case, the terminal device may determine the PDSCH receiving occasion sets in a plurality of manners, and then generate the HARQ information. For example, a PDSCH receiving occasion set is determined in a sequence of frequency domain first and time domain next, to be specific, a quantity of frequency domain positions of the BWP combination is obtained based on the K1 value set, and the PDSCH receiving occasion set is determined. Alternatively, a PDSCH receiving occasion set is determined in a sequence of time domain first and frequency domain next, to be specific, the PDSCH receiving occasion set corresponding to the BWP combination in the K1 value set is obtained based on a position of the BWP combination. Alternatively, calculation is separately performed in time domain and frequency domain, and then multiplication is performed, to determine a PDSCH receiving occasion set. The K1 value set may be a K1 value set corresponding to the at least one of the plurality of active BWPs, the predefined K1 value set, or the K1 value set corresponding to the at least one of the plurality of BWP combinations.

With reference to the first method, in some implementations of the first aspect, the terminal device determines a maximum quantity of BWP combinations in a feedback window. That the terminal device generates HARQ information based on a parameter corresponding to the BWP combination includes: The terminal device determines, based on the maximum quantity of BWP combinations in the HARQ feedback window, PDSCH receiving occasion sets corresponding to all the BWP combinations. The terminal device generates the HARQ information based on the PDSCH receiving occasion sets corresponding to all the BWP combinations.

Based on the foregoing technical solution, the terminal device may first determine a maximum quantity of BWP combinations that can be configured, and then determine the PDSCH receiving occasion sets.

With reference to the first aspect, in some implementations of the first aspect, the method further includes: The terminal device receives a second message sent by the network device. The second message is used to indicate at least one of the following: a quantity of codewords CWs of the active BWP in the BWP combination, a quantity of code block groups CBGs of the active BWP in the BWP combination, and HARQ information space bundling indication information. The terminal device determines a quantity of bits of the second HARQ information based on the second message.

With reference to the first aspect, in some implementations of the first aspect, that the terminal device determines a quantity of bits of the second HARQ information based on the second message includes: The terminal device determines the quantity of bits of the second HARQ information based on a maximum value of the quantity of CWs or a maximum value of the quantity of CBGs.

Based on the foregoing technical solution, the quantity of bits of the HARQ information corresponding to the BWP combination may be determined based on a maximum value of quantities of codewords or code block groups of all BWPs included in the BWP combination.

According to a second aspect, a method for generating hybrid automatic repeat request HARQ information is provided. The method includes: A network device sends a first message to a terminal device. The first message is used to indicate that there is a bandwidth part BWP combination in a cell, and the BWP combination includes an active BWP. The network device receives HARQ information sent by the terminal device.

Based on the foregoing technical solution, there may be a plurality of active BWPs in one serving cell (namely, an example of a cell). When the network device configures a plurality of active BWPs for the terminal device, where the plurality of active BWPs may be considered as one BWP combination, and the BWP combination corresponds to one set of unified parameters, the network device may send, to the terminal device, information indicating the BWP combination, and then the terminal device generates the HARQ information based on the parameters corresponding to the BWP combination.

With reference to the second aspect, in some implementations of the second aspect, at least two active BWPs in the BWP combination are used to transmit a same transport block.

Based on the foregoing technical solution, the at least two active BWPs included in the BWP combination may be used to transmit the same transport block. For example, the at least two active BWPs may respectively carry different parts of a same encoded transport block, or the at least two active BWPs may respectively carry different data obtained after a same transport block is encoded by using different redundancy versions.

With reference to the second aspect, in some implementations of the second aspect, a plurality of active BWPs in the BWP combination are located on different carriers of the cell.

Based on the foregoing technical solution, the plurality of active BWPs in the BWP combination may be located on different carriers of a same cell.

With reference to the second aspect, in some implementations of the second aspect, the HARQ information is determined by the terminal device based on a physical downlink shared channel PDSCH receiving occasion set corresponding to the BWP combination, and the PDSCH receiving occasion set corresponding to the BWP combination is determined by the terminal device based on a parameter corresponding to the BWP combination.

Based on the foregoing technical solution, the terminal device may determine, based on the parameter corresponding to the BWP combination, the PDSCH receiving occasion set corresponding to the BWP combination, and then generate the HARQ information based on the PDSCH receiving occasion set.

With reference to the second aspect, in some implementations of the second aspect, the parameter corresponding to the BWP combination includes a parameter corresponding to at least one of the plurality of active BWPs, or a predefined parameter.

Based on the foregoing technical solution, the parameter corresponding to the BWP combination may be a parameter corresponding to any active BWP included in the BWP combination, or may be a set of parameters corresponding to some or all active BWPs included in the BWP combination, or may be a parameter preconfigured by the network device for the BWP combination.

With reference to the second aspect, in some implementations of the second aspect, the method further includes: The network device sends a second message to the terminal device. The second message is used to indicate at least one of the following: a quantity of codewords CWs of the active BWP in the BWP combination, a quantity of code block groups CBGs of the active BWP in the BWP combination, and HARQ information space bundling indication information.

According to a third aspect, a terminal device is provided. The terminal device has functions of implementing the terminal device in the foregoing method designs of the first aspect. The functions may be implemented by hardware, or may be implemented by hardware executing corresponding software. The hardware or the software includes one or more units corresponding to the foregoing functions.

According to a fourth aspect, a network device is provided. The network device has functions of implementing the network device in the foregoing method designs of the second aspect. The functions may be implemented by hardware, or may be implemented by hardware executing corresponding software. The hardware or the software includes one or more units corresponding to the foregoing functions.

According to a fifth aspect, a terminal device is provided. The terminal device includes a transceiver, a processor, and a memory. The processor is configured to control the transceiver to send and receive information. The memory is configured to store a computer program. The processor is configured to invoke the computer program from the memory and run the computer program, so that the terminal device performs the method according to any one of the first aspect and the possible implementations of the first aspect.

According to a sixth aspect, a network device is provided, including a transceiver, a processor, and a memory. The processor is configured to control the transceiver to send and receive information. The memory is configured to store a computer program. The processor is configured to invoke the computer program from the memory and run the computer program, so that the network device performs the method according to any one of the second aspect and the possible implementations of the second aspect.

According to a seventh aspect, an apparatus is provided. The apparatus may be the terminal device in the foregoing method designs, or may be a chip disposed in the terminal device. The apparatus includes a processor, and the processor is coupled to a memory and may be configured to execute an instruction in the memory, to implement the method performed by the terminal device according to any one of the first aspect and the possible implementations of the first aspect. Optionally, the apparatus further includes the memory. Optionally, the apparatus further includes a communications interface, and the processor is coupled to the communications interface.

According to an eighth aspect, an apparatus is provided. The apparatus may be the network device in the foregoing method designs, or may be a chip disposed in the network device. The apparatus includes a processor, and the processor is coupled to a memory and may be configured to execute an instruction in the memory, to implement the method performed by the network device according to any one of the second aspect and the possible implementations of the second aspect. Optionally, the apparatus further includes the memory. Optionally, the apparatus further includes a communications interface, and the processor is coupled to the communications interface.

According to a ninth aspect, a communications system is provided. The communications system includes the network device and the terminal device in the foregoing method designs.

According to a tenth aspect, a computer program product is provided. The computer program product includes computer program code; and when the computer program code is run on a computer, the computer is enabled to perform the methods in the foregoing aspects.

According to an eleventh aspect, a computer-readable medium is provided. The computer-readable medium stores program code; and when the computer program code is run on a computer, the computer is enabled to perform the methods in the foregoing aspects.

According to a twelfth aspect, a chip system is provided. The chip system includes a processor, configured to support a terminal device in implementing functions in the foregoing aspects, for example, generating, receiving, sending, or processing data and/or information in the foregoing methods. In a possible design, the chip system further includes a memory, and the memory is configured to store a program instruction and data that are necessary for the terminal device. The chip system may include a chip, or may include a chip and another discrete component.

According to a thirteenth aspect, a chip system is provided. The chip system includes a processor, configured to support a network device in implementing functions in the foregoing aspects, for example, generating, receiving, sending, or processing data and/or information in the foregoing methods. In a possible design, the chip system further includes a memory, and the memory is configured to store a program instruction and data that are necessary for the terminal device. The chip system may include a chip, or may include a chip and another discrete component.

DESCRIPTION OF EMBODIMENTS

The following describes the technical solutions of this application with reference to the accompanying drawings.

The technical solutions of embodiments of this application may be applied to various communications systems, such as: a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communications system, a 5th generation (5th generation, 5G) system, or a new radio (new radio, NR) system.

Figure 1:
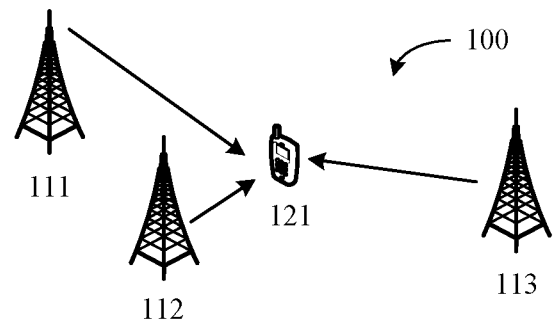
FIG. 1 is a schematic diagram of a communications system applicable to a method for generating HARQ information according to an embodiment of this application.
Figure 2:
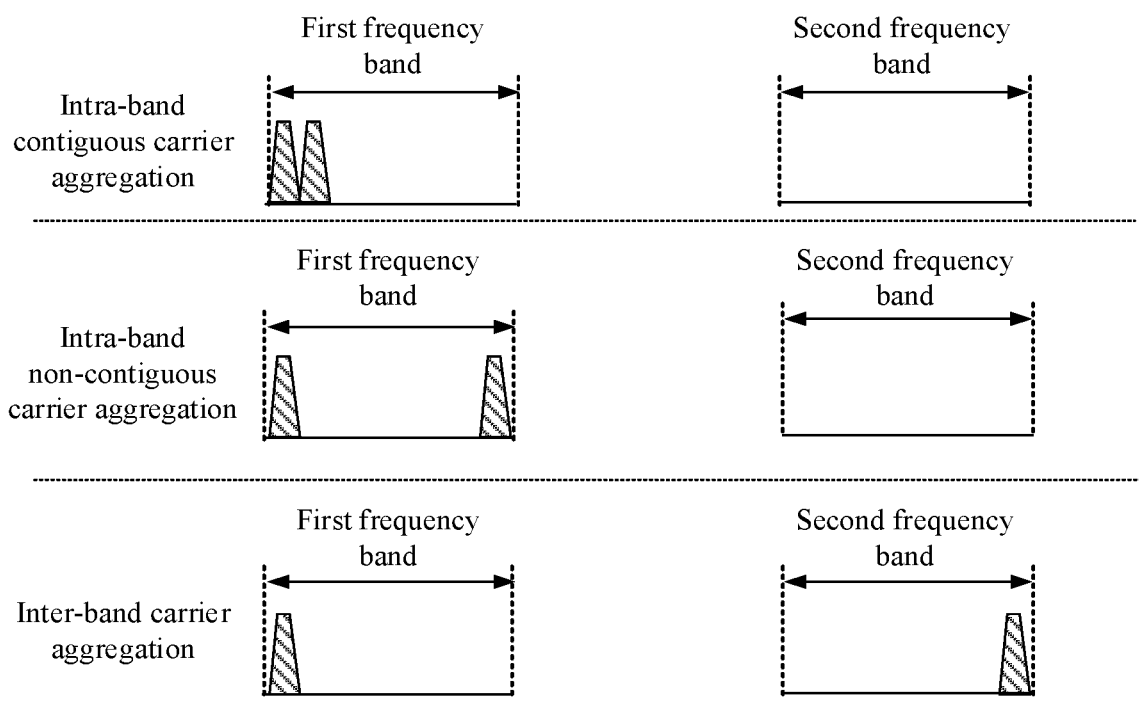
FIG. 2 is a schematic diagram of carrier aggregation applicable to an embodiment of this application.

For ease of understanding the embodiments of this application, a communications system shown in FIG. 1 is first used as an example to describe in detail a communications system applicable to the embodiments of this application. FIG. 1 is a schematic diagram of a wireless communications system 100 applicable to embodiments of this application. As shown in FIG. 1, the wireless communications system 100 may include one or more network devices, for example, a network device #1 111, a network device #2 112, and a network device #3 113 shown in FIG. 1. The wireless communications system 100 may further include one or more terminal devices, for example, a terminal device 121 shown in FIG. 1. The wireless communications system 100 may further support CoMP transmission. To be specific, a plurality of cells or a plurality of network devices may cooperatively participate in transmitting data to one terminal device or jointly receive data sent by one terminal device, or a plurality of cells or a plurality of network devices perform coordinated scheduling or coordinated beamforming. The plurality of cells may belong to a same network device or different network devices, and may be selected based on a channel gain, a path loss, a received signal strength, a received signal instruction, or the like.

It should be understood that the network device in the system 100 may be any device that has a wireless transceiver function or a chip that can be disposed in the device. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a donor eNB (donor eNB, DeNB), a baseband unit (baseband Unit, BBU), an access point (access point, AP), a wireless relay node, a wireless backhaul node, a transmission point (transmission point, TP), a transmission reception point (transmission and reception point, TRP), and the like in a wireless fidelity (wireless fidelity, Wi-Fi) system. The device may alternatively be a gNB or a transmission point (TRP or TP) in a 5G, such as NR, system, one or a group of (including a plurality of antenna panels) antenna panels of a base station in a 5G system, a network node that constitutes a gNB or a transmission point, for example, a baseband unit (BBU) or a distributed unit (distributed unit, DU), or the like.

In some deployments, the gNB may include a central unit (centralized unit, CU) and a DU. The gNB may further include a radio frequency unit (radio unit, RU). The CU implements some functions of the gNB, and the DU implements some functions of the gNB. For example, the CU implements functions of a radio resource control (radio resource control, RRC) layer and a packet data convergence protocol (packet data convergence protocol, PDCP) layer, and the DU implements functions of a radio link control (radio link control, RLC) layer, a media access control (media access control, MAC) layer, and a physical (physical, PHY) layer. Because information at the RRC layer finally becomes information at the PHY layer, or is converted from information at the PHY layer, in this architecture, higher layer signaling such as RRC signaling or PHCP signaling may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

It should be further understood that the terminal device in the system 100 may also be referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone (mobile phone), a tablet computer (Pad), a computer having a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. In this application, the foregoing terminal device and a chip that can be disposed in the foregoing terminal device are collectively referred to as a terminal device.

Optionally, in the communications system 100 shown in FIG. 1, one (for example, the network device #1) of the network device #1 to the network device #3 may be a serving network device. The serving network device may be a network device that provides at least one of an RRC connection, non-access stratum (non-access stratum, NAS) mobility management, and security input for the terminal device by using a wireless air interface protocol. Optionally, the network device #2 and the network device #3 each may be a coordinated network device. The serving network device may send control signaling to the terminal device, and the coordinated network device may send data to the terminal device. Alternatively, the serving network device may send control signaling to the terminal device, and the serving network device and the coordinated network device may send data to the terminal device. Alternatively, both the serving network device and the coordinated network device may send control signaling to the terminal device, and both the serving network device and the coordinated network device may send data to the terminal device. Alternatively, the coordinated network device may send control signaling to the terminal device, and at least one of the serving network device and the coordinated network device may send data to the terminal device. Alternatively, the coordinated network device may send control signaling and data to the terminal device. This is not particularly limited in the embodiments of this application.

Optionally, in the communications system 100 shown in FIG. 1, the network device #1 to the network device #3 each may be a serving network device.

It should be understood that FIG. 1 shows only an example of the network device #1 to the network device #3 and the terminal device for ease of understanding. However, this should not constitute any limitation on this application. The wireless communications system may further include more or fewer network devices and more terminal devices. Network devices communicating with different terminal devices may be a same network device, or may be different network devices. Quantities of network devices communicating with different terminal devices may be the same, or may be different. This is not limited in this application.

A hybrid automatic repeat request (hybrid automatic repeat request, HARQ) is a technology combining a forward error correction (forward error correction, FEC) method and an automatic repeat request (automatic repeat request, ARQ) method. FEC enables a receive end to correct some errors by adding redundant information, thereby reducing a quantity of retransmission times. The FEC is commonly referred to as redundant channel coding. For an error that the FEC cannot correct, the receive end requests a transmit end to retransmit data by using an ARQ mechanism. The receive end detects, by using an error detection code, for example, cyclic redundancy check (cyclic redundancy check, CRC), whether an error occurs in a received data packet. If there is no error, an acknowledgement (Acknowledgement, ACK) is sent, where the ACK is usually represented by "1". If there is an error, the receive end discards the data packet or saves the data packet for use after the data is retransmitted and combined with the data packet, and sends a negative acknowledgement (Negative Acknowledgement, NACK) to the transmit end, where the NACK is usually represented by "0". After receiving the NACK, the transmit end usually retransmits the same data.

This application mainly considers a scenario in which a serving cell is extended and may include a plurality of downlink carriers, or one carrier includes a plurality of active downlink bandwidth parts, and provides a method for generating a HARQ codebook. In other words, in this application, a method for generating a HARQ codebook is considered when one cell may include a plurality of active bandwidth parts, and the plurality of active bandwidth parts may be located on a same carrier in the cell, or may be located on different carriers in the cell.

For ease of understanding the embodiments of this application, before the embodiments of this application are described, several nouns or terms used in this application are first briefly described.

1. Physical Downlink Control Channel

The physical downlink control channel (physical downlink control channel, PDCCH) may be used to send downlink scheduling information (DL assignment) to a terminal, so that the terminal receives a physical downlink shared channel (physical downlink shared channel, PDSCH). The PDCCH may be further used to send uplink scheduling information (UL Grant) to the terminal, so that the terminal sends a physical uplink shared channel (physical uplink shared channel, PUSCH). The PDCCH may be further used to send an aperiodic channel quality indicator (channel quality indicator, CQI) report request. The PDCCH may be further used to notify a change of a multicast control channel (multicast control channel, MCCH). The PDCCH may be further used to send an uplink power control command. The PDCCH may be further used for HARQ-related information. The PDCCH may be further used to carry a radio network temporary identifier (radio network temporary identifier, RNTI), where the information is implicitly included in cyclic redundancy check (cyclic redundancy check, CRC), and the like.

2. Downlink Control Information

Information carried on a PDCCH is referred to as downlink control information (downlink control information, DCI). The downlink DCI may be used to send downlink scheduling assignment information or uplink scheduling information. The DCI has a plurality of formats (format), and various DCI formats and specific information carried in the DCI formats vary with functions of the DCI formats. For example, a format 0 in an LTE system or a format 0_0/format 0_1 in an NR system may be used to transmit PUSCH scheduling grant information. For another example, a format 1 in an LTE system or a format 0_0/format 0_1 in an NR system may be used to transmit PDSCH single-codeword scheduling grant information.

The DCI may indicate cell-level information, and may be scrambled by using a system information radio network temporary identifier (system information radio network temporary identifier, SI-RNTI), a paging radio network temporary identifier (paging radio network temporary identifier, P-RNTI), a random access radio network temporary identifier (random access radio network temporary identifier, RA-RNTI), or the like. The DCI may alternatively indicate terminal-level information, and may be scrambled by using a cell radio network temporary identifier (cell radio network temporary identifier, C-RNTI).

One PDCCH usually carries one piece of DCI of a specific format. A cell may schedule a plurality of terminals simultaneously in an uplink and a downlink. To be specific, a cell may send a plurality of pieces of scheduling information in each scheduling time unit. Each piece of scheduling information is transmitted on an independent PDCCH. To be specific, a cell may simultaneously send a plurality of PDCCHs in one scheduling time unit.

3. Cell

The cell is described by a higher layer from a perspective of resource management, mobility management, or a service unit. Coverage of each network device may be divided into one or more serving cells, and the serving cell may be considered as including a specific frequency domain resource. In other words, one serving cell may include a carrier. Actually, in existing LTE and NR, one cell usually includes one downlink carrier.

It should be understood that the "cell" in the embodiments of this application may be a "serving cell".

Carrier aggregation (carrier aggregation, CA) is to aggregate two or more carriers to support a higher transmission bandwidth. Existing downlink carrier aggregation is also aggregation of a plurality of cells.

A primary cell (primary cell, PCell) is a cell in which a terminal performs initial connection establishment, or a cell in which a terminal performs RRC connection reestablishment, or a primary cell designated in a handover (handover) process.

A secondary cell (secondary cell, SCell) is added during RRC reconfiguration, and is used to provide additional radio resources. A carrier corresponding to the SCell may be referred to as a secondary carrier. A terminal that supports carrier aggregation may be connected to one PCells and a plurality of SCells.

4. Downlink HARQ Codebook

HARQ information is classified into downlink HARQ information and uplink HARQ information. The downlink HARQ information is HARQ information of downlink data (for example, a PDSCH), and may also be referred to as HARQ-ACK information. The uplink HARQ information is HARQ information of uplink data (for example, a PUS CH), and may also be referred to as HARQ-ACK information of the PUSCH. The embodiments of this application are mainly directed at the downlink HARQ information.

The downlink HARQ information is a type of uplink control information (uplink control information, UCI). The UCI may be used to carry at least one of channel state information (channel state information, CSI) (which may include, for example, one or more of a precoding matrix indicator (precoding matrix indicator, PMI), a rank indication (rank indication, RI), and a channel quality indicator (channel quality indicator, CQI)), downlink HARQ information, and an uplink scheduling request (scheduling request, SR).

Figure 3:
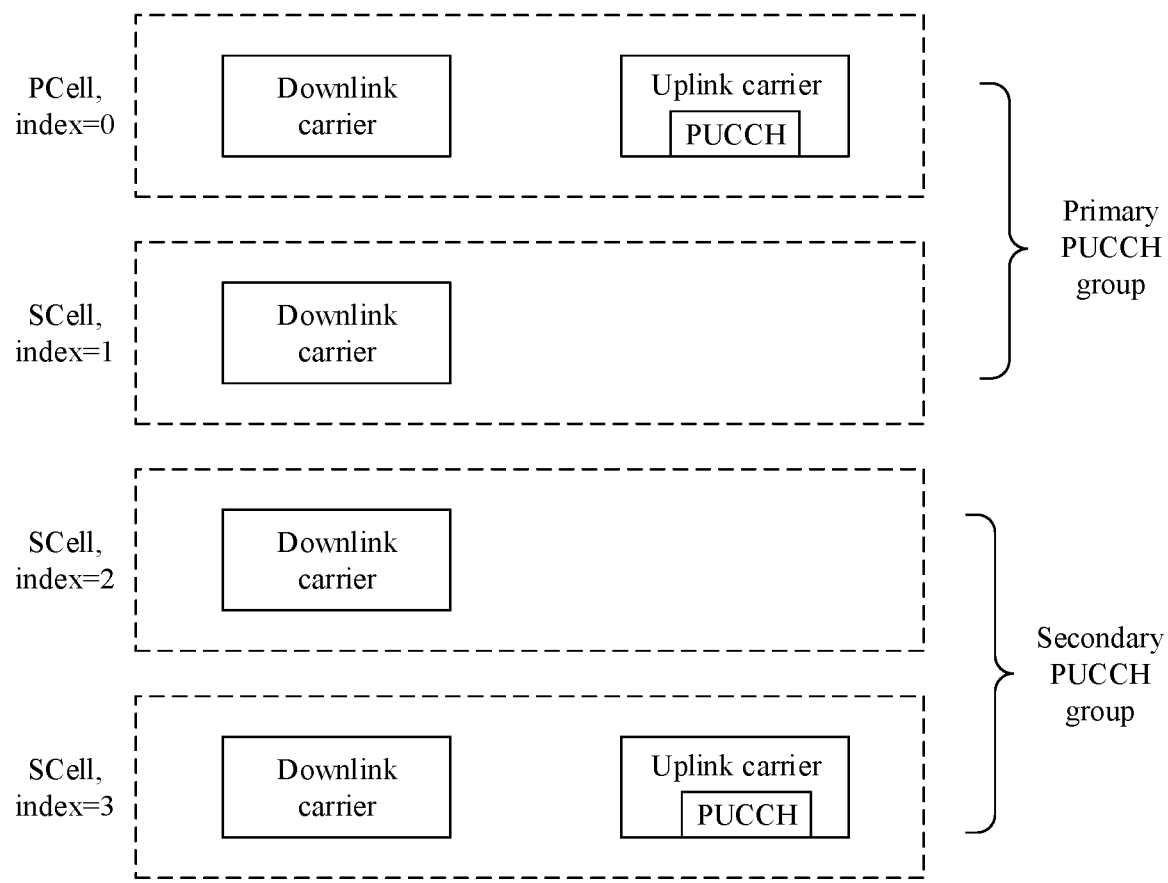
FIG. 3 is a schematic diagram of a serving cell, a carrier, and a PUCCH group that are applicable to an embodiment of this application.

Generally, the downlink HARQ information is sent on a physical uplink control channel (physical uplink control channel, PUCCH), and may also be sent on a PUSCH when a specific condition is met. In a carrier aggregation scenario, because an uplink carrier aggregation capability on a terminal side is limited, HARQ information of downlink data on a plurality of downlink carriers is fed back on a few uplink carriers. When a terminal does not have an uplink carrier aggregation capability (to be specific, the terminal supports uplink single-carrier sending), PDSCHs on a plurality of carriers feed back HARQ-ACK information by using a PUCCH on one uplink primary carrier. When the terminal has the uplink carrier aggregation capability, downlink carriers (carrier) may be grouped, and a PUCCH on one uplink carrier is used for each group of downlink carriers to feed back HARQ-ACK information. Each group corresponds to one PUCCH. Therefore, each group may also be referred to as a PUCCH group (PUCCH group). A PUCCH group including a primary carrier may be referred to as a primary PUCCH group (primary PUCCH group), and another PUCCH group is referred to as a secondary PUCCH group (secondary PUCCH group). FIG. 3 is a schematic diagram of a cell, a carrier, and a PUCCH group. In FIG. 3, one PCell and three SCells are used as an example for description.

Figure 4:
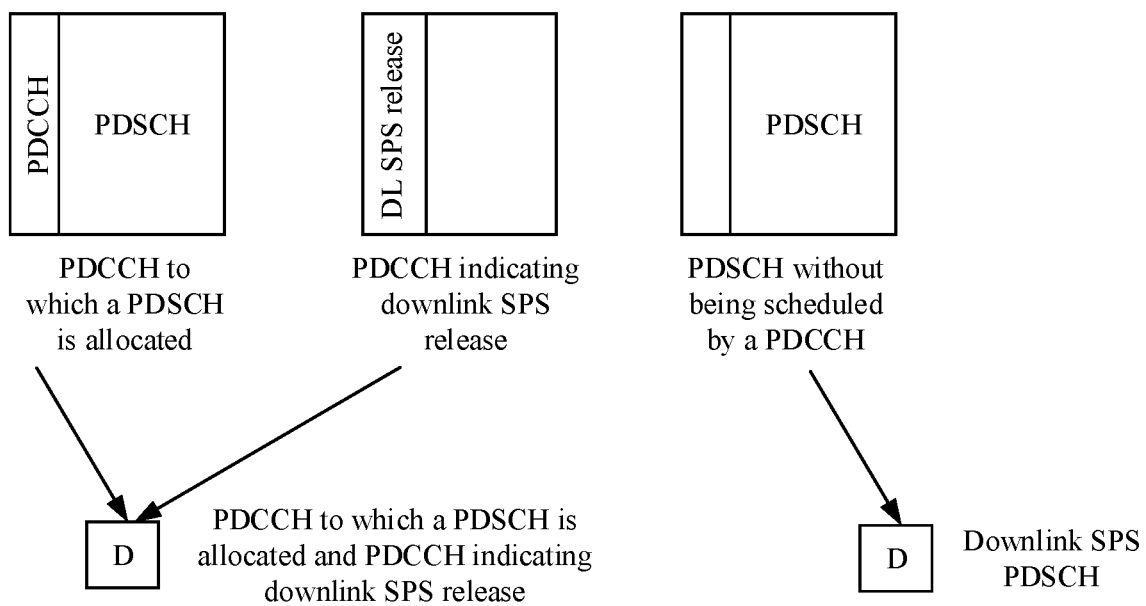
FIG. 4 is a schematic diagram of types, of downlink data that requires a HARQ feedback, applicable to an embodiment of this application.

A HARQ codebook may be understood as HARQ information bits sent on a PUCCH resource or a PUSCH resource. For example, the HARQ codebook includes a size (namely, a quantity of the HARQ information bits) of the codebook and a sequence of the HARQ information bits. FIG. 4 shows types of downlink data that requires a HARQ feedback. As shown in FIG. 4, the types of the downlink data for which HARQ information needs to be fed back include a PDSCH corresponding to a PDCCH, semi-persistent scheduling (semi-persistent scheduling, SPS) PDSCH, and downlink SPS release (RELEASE), which may also be referred to as SPS PDSCH release. For ease of description, the first two types of downlink data are collectively referred to as PDSCH data, and the SPS PDSCH release is used as special downlink data and is not described separately.

5. FEC Encoding

If a receive end cannot correctly decode data sent by a transmit end once, a manner of discarding this data packet and requesting retransmission may be used. Although these data packets cannot be correctly decoded, useful information is still included therein, and if the data packets are discarded, the useful information is lost. By using a HARQ with soft combining (HARQ with soft combining), a received erroneous data packet is saved in a HARQ buffer (buffer), and is combined with a subsequently received retransmitted data packet, to obtain a data packet that is more reliable than a data packet that is separately decoded (a "soft combining" process). Then a combined data packet is decoded. If decoding still fails, a process of "requesting retransmission, and then performing soft combining" is repeated.

The HARQ with soft combining is classified into chase combining (chase combining) and incremental redundancy (incremental redundancy) based on whether retransmitted bit information is the same as that in original transmission. Retransmitted bit information in the chase combining is the same as that in original transmission while retransmitted bit information in the incremental redundancy does not need to be the same as that in original transmission. In the incremental redundancy, each retransmission does not need to be the same as initial transmission. On the contrary, a plurality of coded (coded) bit sets are generated, and each set carries same information. When retransmission is required, a coded bit set different from a previous one is usually transmitted, and the receive end combines retransmitted data with previously transmitted data. A coded bit set in each retransmission is referred to as a redundancy version (redundancy version, RV).

After primary encoding (polar encoding or LDPC encoding), systematic bits (systematic bits), first parity bits (first parity bits), and second parity bits (second parity bits) are output. These outputs are interleaved and then inserted into a circular buffer (circular buffer). The systematic bits are inserted first, and then the first parity bits and the second parity bits are inserted alternately. Different RVs are encoded data segments that start from different start locations in the circular buffer.

6. Numerology (Numerology)

The numerology may refer to a set of parameters, including a subcarrier spacing (subcarrier spacing, SCS), a symbol length, a slot length, a cyclic prefix (Cyclic Prefix, CP) length, and the like. In NR, a new feature is that a plurality of numerologies may be mixed and used at the same time. The numerology is defined by using an SCS and a CP. Table 1 shows a plurality of numerologies that currently can be supported in the NR.

TABLE 1

| μ | $\Delta f = 2^\mu * 15$ (kHz) | CP |
|---|---|---|
| 0 | 15 | Normal (Normal) |
| 1 | 30 | Normal |
| 2 | 60 | Normal and extended (Extended) |
| 3 | 120 | Normal |
| 4 | 240 | Normal |

Specifically, it can be learned from Table 1 that μ may be used to represent different numerologies. It can be learned from Table 1 that at least four different numerologies, namely, μ=0, μ=1, μ=2, μ=3, and μ=4, are included. In the embodiments of this application, μ is denoted as μ0, μ1, μ2, μ3, and μ4 for differentiation. When μ=0, $SCS=2^\mu*15=2^0*15=15$ kHz. When μ=1, $SCS=2^\mu*15=2^1*15=30$ kHz. When μ=2, $SCS=2^\mu*15=2^2*15=60$ kHz. When μ=3, $SCS=2^\mu*15=2^3*15=120$ kHz. When μ=4, $SCS=2^\mu*15=2^4*15=240$ kHz.

7. Bandwidth Part

Figure 5:
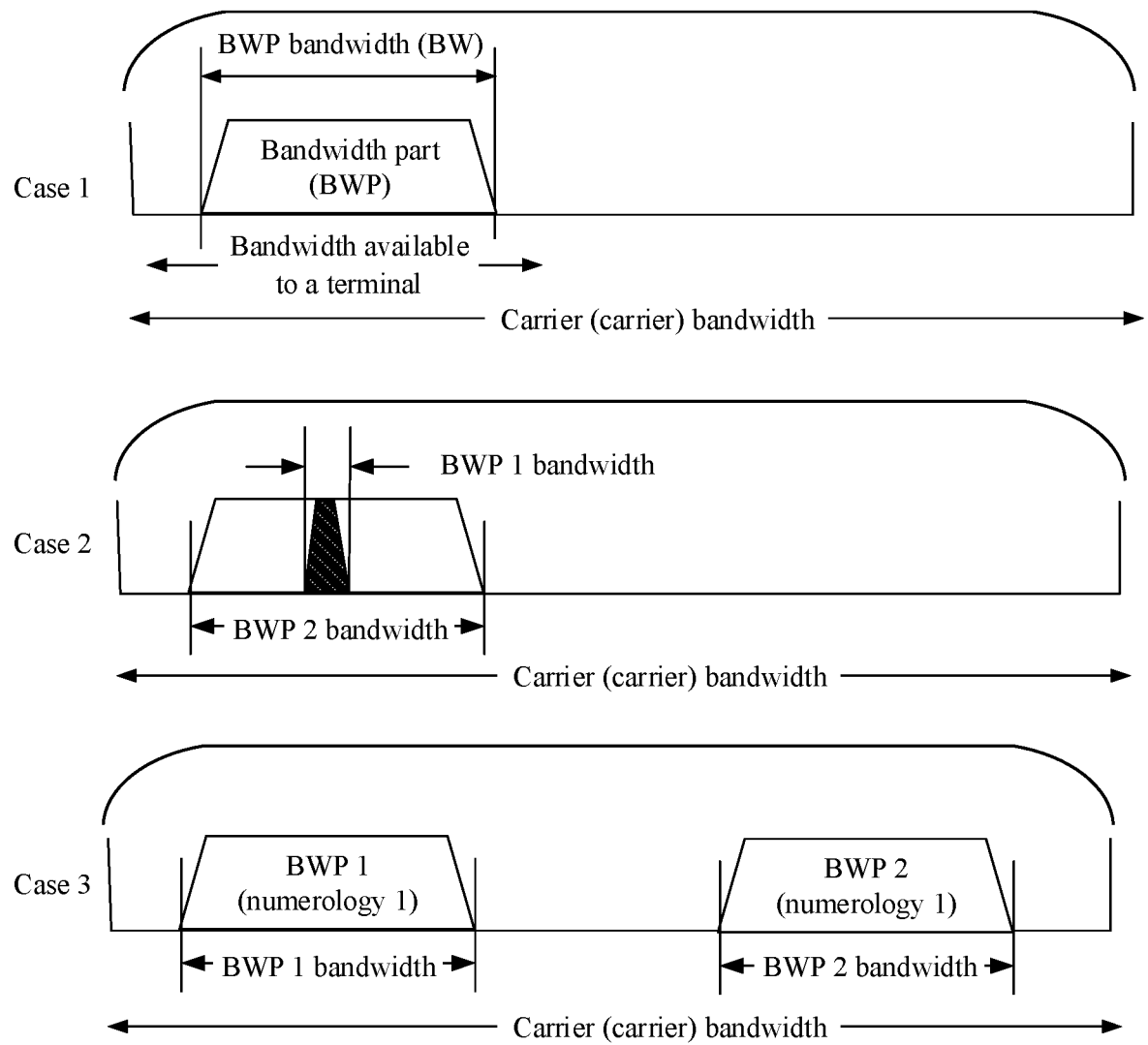
FIG. 5 is a schematic diagram of a BWP applicable to an embodiment of this application.

In NR, a carrier of a base station has a wider bandwidth than an LTE carrier. For example, a bandwidth of an NR carrier may be 100 M. Different terminals have different radio frequency capabilities, and can support different maximum bandwidths. Therefore, a concept of a bandwidth part (bandwidth part, BWP) is introduced. FIG. 5 is a schematic diagram of a BWP. A BWP is a group of consecutive RB resources on a carrier. Different BWPs may occupy frequency domain resources that partially overlap but have different bandwidths, or may be bandwidth resources that have different numerologies but may not overlap with each other in frequency domain. In NR Rel-15, one serving cell may configure a maximum of four BWPs for one terminal device, for example, four BWPs in each of an uplink and a downlink in frequency division duplex (frequency division duplexing, FDD), or a total of four BWP pairs in an uplink and a downlink in time division duplex (time division duplexing, TDD). Each serving cell can activate one BWP at the same time, and the terminal transmits and receives data on the active BWP.

8. HARQ Information Space Bundling

The HARQ information space bundling means that when two transport blocks are sent in one downlink time unit in a same cell, logical "AND" processing is performed on HARQ information corresponding to the two transport blocks, to obtain one-bit HARQ information.

In the embodiments of this application, for brief description, a DL BWP represents a downlink BWP, and an UL BWP represents an uplink BWP.

When one cell may include a plurality of active BWPs, and the plurality of active BWPs may be located on a same carrier, or may be located on different carriers, how to generate a HARQ codebook is a main concern of this application.

It should be particularly noted that, in the embodiments of this application, "BWP bundle X" and "BWP bundle ID=X" are usually interchangeably used, but meanings of "BWP bundle X" and "BWP bundle ID=X" may be understood by a person skilled in the art. "BWP bundle X" or "BWP bundle ID=X" may indicate that an index number or an identifier of a BWP bundle is X, where X may be 0, 1, 2, . . . . For example, BWP bundle 0 or BWP bundle ID=0 indicates that an index number or an identifier of a BWP bundle is 0. "Cell Y" and "cell index=Y" are also often interchangeably used, but meanings of "cell Y" and "cell index=Y" may be understood by a person skilled in the art. "Cell Y" or "cell index=Y" may indicate that an index number or an identifier of a cell is Y, where Y may be 0, 1, 2, . . . . For example, cell 0 or cell index=0 indicates that an index number or an identifier of a cell is 0.

It should be further noted that in the embodiments of this application, a "protocol" may be a standard protocol in the communications field, for example, may include an LTE protocol, an NR protocol, and a related protocol applied to a future communications system. This is not limited in this application.

It should be further noted that in the embodiments of this application, nouns "network" and "system" are usually interchangeably used, but meanings of the nouns may be understood by a person skilled in the art. Nouns "component carrier", "carrier unit", and "carrier" are usually interchangeably used, but meanings of the nouns may be understood by a person skilled in the art. Terms "information (information)", "signal (signal)", "message (message)", and "channel (channel)" may be interchangeably used sometimes. It should be noted that meanings expressed by the terms are consistent when differences of the terms are not emphasized. Terms "of (of)", "corresponding (corresponding, relevant)", and "corresponding to (corresponding)" may be interchangeably used sometimes. It should be noted that meanings expressed by the terms are consistent when differences of the terms are not emphasized.

It should be further noted that in the embodiments of this application, "identifier (identifier, ID)" and "index (index)" are usually interchangeably used, but meanings of "identifier (identifier, ID)" and "index" may be understood by a person skilled in the art. It should be noted that the meanings expressed by "identifier (identifier, ID)" and "index" are consistent when differences of "identifier (identifier, ID)" and "index" are not emphasized.

It should be further noted that in the embodiments of this application, "at least one" may represent "one or more". For example, that at least one of a manner A, a manner B, and a manner C is used for implementation represents that the manner A is used for implementation, the manner B is used for implementation, or the manner C is used for implementation; or may represent that the manner A and the manner B are used for implementation, the manner B and the manner C are used for implementation, or the manner A and the manner C are used for implementation; or may represent that the manner A, the manner B, and the manner C are used for implementation. Similarly, "at least two" may represent "two or more".

It should be further noted that in the embodiments below, "first", "second", "third", and the like are intended to distinguish between different objects, but should not constitute any limitation on this application.

It should be further noted that the term "and/or" describes an association relationship for describing associated objects and represents that three relationships may exist. For example, A and/or B may represent the following three cases: Only A exists, both A and B exist, and only B exists. The character "/" usually represents an "or" relationship between the associated objects. "At least one" is similar to "A and/or B", describes an association relationship between associated objects, and represents that three relationships may exist. For example, at least one of A and B may represent the following three cases: Only A exists, both A and B exist, and only B exists. The following describes the technical solutions provided in this application in detail with reference to the accompanying drawings.

It should be understood that a method for generating hybrid automatic repeat request HARQ information provided in this application is applicable to a wireless communications system, for example, the wireless communications system 100 shown in FIG. 1. A terminal device in the embodiments of this application may simultaneously communicate with one or more network devices. For example, a network device in the embodiments of this application may correspond to any one or more of the network device #1 111, the network device #2 112, and the network device #3 113 in FIG. 1, and the terminal device in the embodiments of this application may correspond to the terminal device 121 in FIG. 1.

Without loss of generality, the following describes the embodiments of this application in detail by using an interaction process between one terminal device and one network device as an example. The terminal device may be any terminal device that is in a wireless communications system and that has a wireless connection relationship with one or more network devices. It may be understood that the any terminal device in the wireless communications system may implement wireless communication based on a same technical solution. This is not limited in this application.

Figure 6:
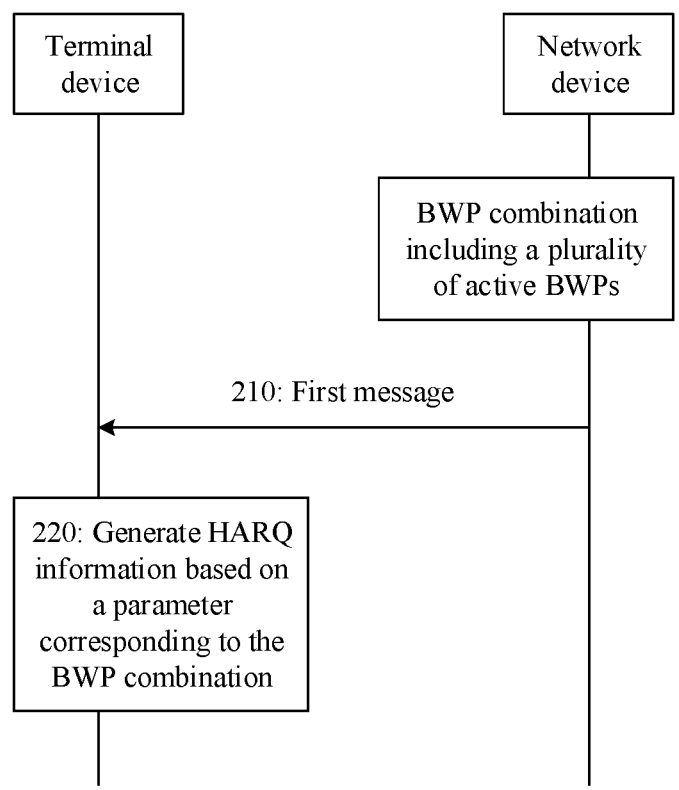
FIG. 6 is a schematic interaction diagram of a method for generating HARQ information applicable to an embodiment of this application.

FIG. 6 is a schematic flowchart, shown from a perspective of device interaction, of a method 200 for generating hybrid automatic repeat request HARQ information according to an embodiment of this application. As shown in the figure, the method 200 shown in FIG. 6 may include step 210 and step 220. The following describes the method 200 in detail with reference to FIG. 6.

210: A terminal device receives a first message sent by a network device, where the first message is used to indicate that there is a BWP combination in a cell, and the BWP combination includes an active BWP.

220: The terminal device generates HARQ information based on a parameter corresponding to the BWP combination.

When configuring a plurality of active BWPs for the terminal device, the network device may use the plurality of active BWPs as one BWP combination, and send related information to the terminal device. The BWP combination corresponds to a set of unified parameters. In other words, the plurality of active BWPs correspond to a set of unified parameters. The terminal device may generate, based on the unified parameters, feedback information corresponding to the BWP combination. Optionally, the related information may be the parameter corresponding to the BWP combination.

The cell may include one or more BWP combinations. One BWP combination may include one or more active BWPs. A plurality of BWP combinations may be understood as that each combination includes one or more active BWPs, or some combinations include one or more active BWPs.

Optionally, at least two active BWPs in the BWP combination are used to transmit a same transport block. In this case, in this embodiment of this application, the BWP combination may be referred to as a BWP bundle (bundle). In this embodiment of this application, a plurality of BWPs used to send one transport block (transport block, TB) are referred to as one BWP bundle. Without loss of generality, a BWP #1 and a BWP #2 are used as an example for description. The BWP #1 and the BWP #2 indicate two independent BWPs, and the BWP #1 and the BWP #2 may form a BWP bundle.

It should be noted that the BWP #1 and the BWP #2 are used as the example for description in this embodiment of this application, and this embodiment of this application is not limited thereto. For example, one BWP bundle may include a plurality of active BWPs.

It should be further noted that at different times, transport blocks transmitted in the active BWPs in the BWP bundle may be the same or may be different. This is not limited in this embodiment of this application.

It should be noted that a time in this embodiment of this application may be a time unit, namely, a subframe, a mini-subframe, a slot, a mini-slot, an orthogonal frequency division multiplexing (orthogonal frequency division multiplexing, OFDM) symbol, a time unit smaller than an OFDM symbol, or a time unit larger than a subframe. This is not limited in this application.

Optionally, the plurality of active BWPs in the BWP combination are located on different carriers of one cell.

It should be noted that the BWP bundle may be considered as a combination of a plurality of independent BWPs. Optionally, there is another BWP combination manner. A BWP combination is considered as a whole, and each BWP is considered as a component part of the BWP combination. In this case, to be distinguished from the BWP bundle, the BWP combination in this case is referred to as a BWP #A. The BWP #A may be considered as including at least two frequency parts (frequency part, FP), and the FP herein may also be understood as a non-independent BWP. Without loss of generality, an FP #1 and an FP #2 are used as an example for description. The FP #1 and the FP #2 may be frequency parts, in a same cell, that are activated at the same time and that are located on different carriers, and the FP #1 and the FP #2 may form a BWP combination or a BWP #A.

It should be noted that the FP #1 and the FP #2 are used as the example for description in this embodiment of this application, and this embodiment of this application is not limited thereto. For example, one BWP combination may include a plurality of FPs.

It should be further noted that the BWP #A and the BWP bundle are intended to distinguish between BWP combinations in different cases, and names of the BWP #A and the BWP bundle do not constitute any limitation on this embodiment of this application.

The following describes in detail, with reference to the BWP bundle and the BWP #A respectively, the method for generating HARQ information provided in this embodiment of this application.

The method for generating HARQ information provided in this embodiment of this application is first described with reference to the BWP bundle. Without loss of generality, an example in which a TB #1 is transmitted in a BWP #1 and a BWP #2 is used below for description.

Figure 7:
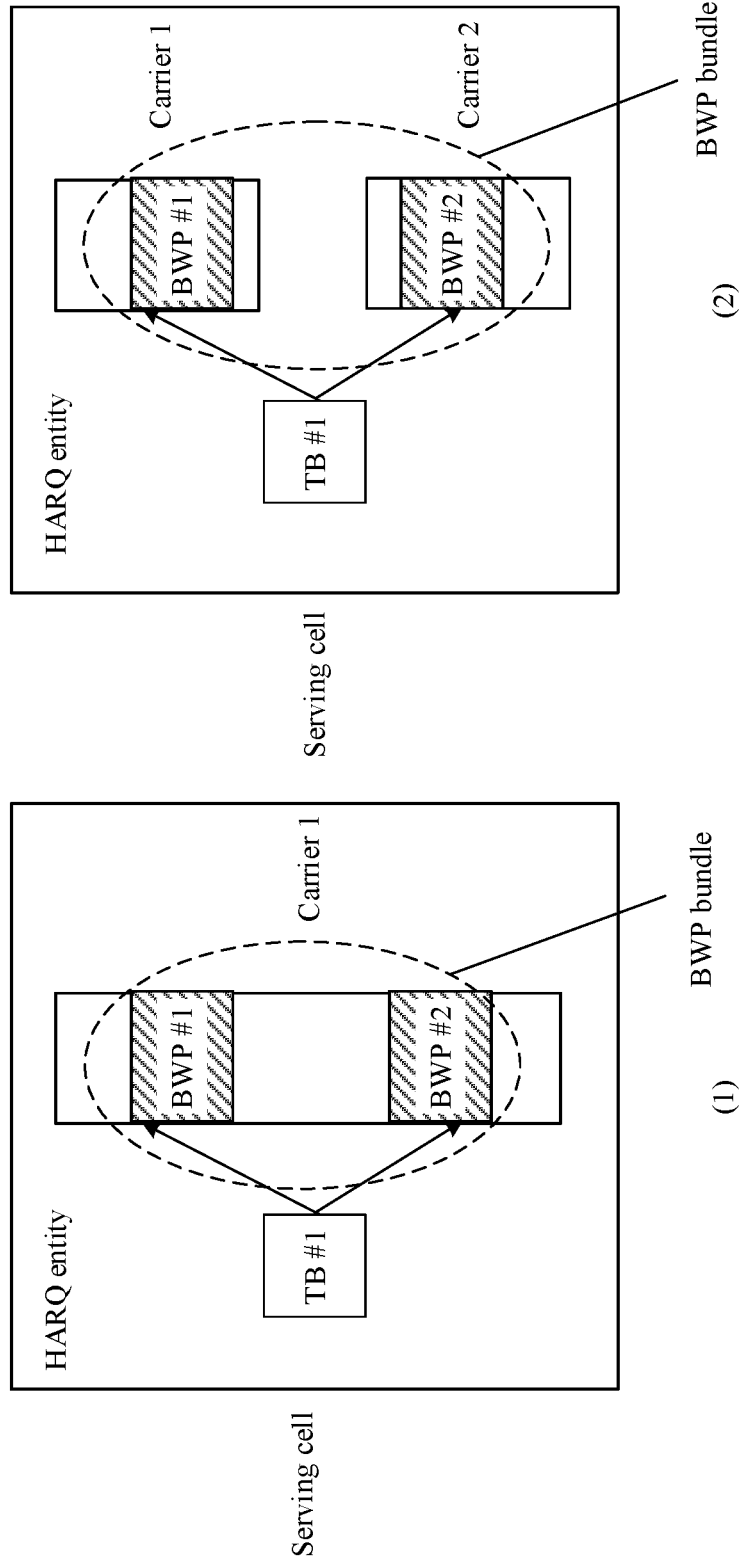
FIG. 7 is a schematic diagram of a BWP bundle applicable to an embodiment of this application.

FIG. 7 is a schematic diagram of a BWP bundle. As shown in FIG. 7, in a serving cell, a TB #1 is sent in a BWP #1 and a BWP #2, and the BWP #1 and the BWP #2 form a BWP bundle. The BWP #1 and the BWP #2 may be located on a same carrier. As shown in (1) of FIG. 7, the BWP #1 and the BWP #2 are located on a carrier 1. The BWP #1 and the BWP #2 may alternatively be located on different carriers. As shown in (2) of FIG. 7, the BWP #1 is located on a carrier 1, and the BWP #2 is located on a carrier 2.

Both the BWP #1 and the BWP #2 carry data related to the TB #1. Specifically, when the TB #1 is sent by using one BWP bundle, at least one of the following two manners may be used for implementation.

Manner 1

The TB #1 is divided into a plurality of bits after being encoded, and the plurality of bits may be respectively sent in a plurality of active BWPs in one BWP bundle.

Figure 8:
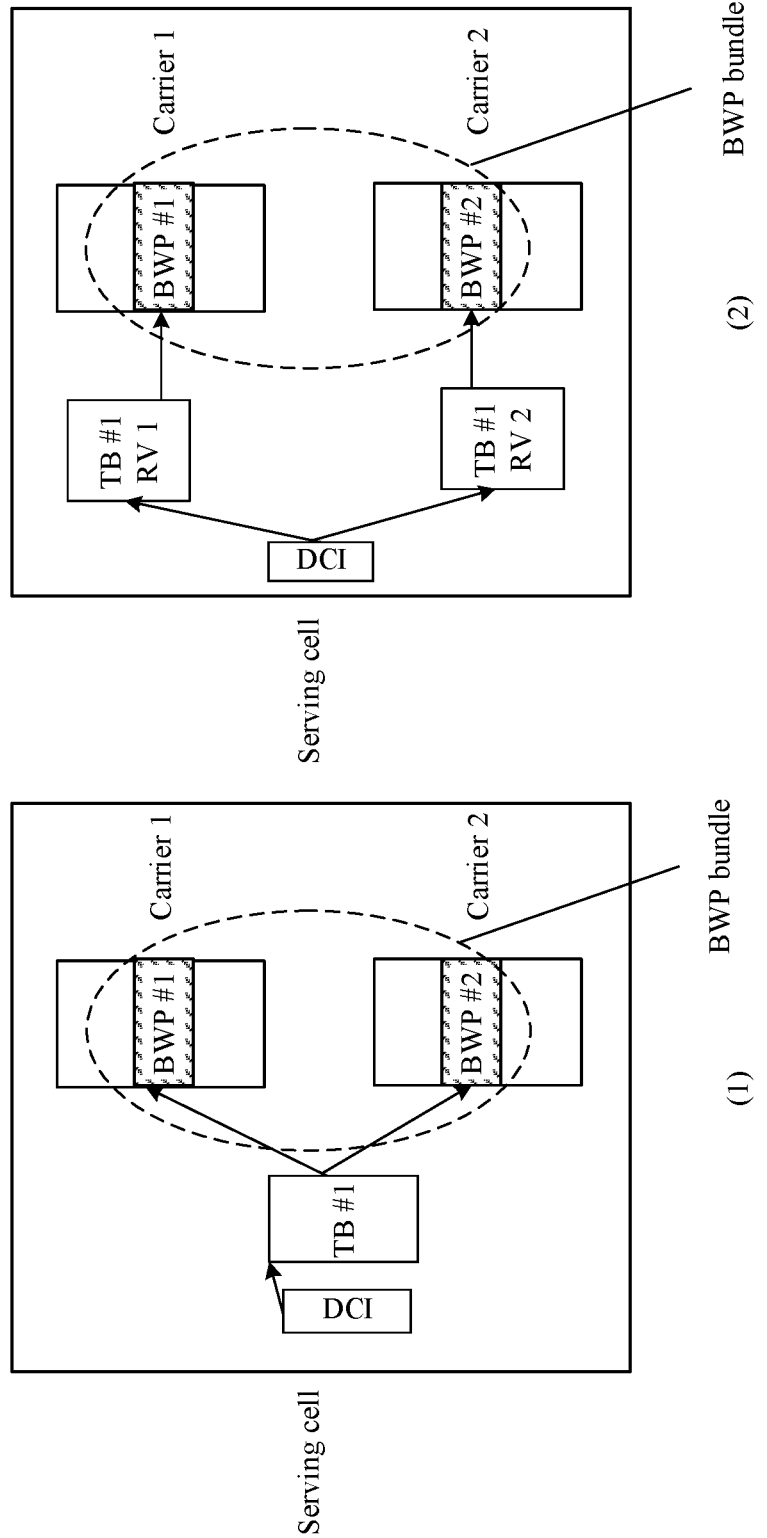
FIG. 8 is a schematic diagram of sending a transport block by using a BWP bundle applicable to an embodiment of this application.

For details, refer to (1) of FIG. 8. It is assumed that the TB #1 is sent in the BWP #1 and the BWP #2, and the TB #1 is divided into two parts after being encoded (for example, P bits are obtained after encoding, and the P bits are divided into two parts: P1 and P2, where P1+P2=P), where the two parts are denoted as a part #1 and a part #2, the part #1 is sent in the BWP #1, and the part #2 is sent in the BWP #2.

It should be noted that an example in which the TB #1 is divided into two parts after being encoded is used for description above. This application is not limited thereto. For example, it is assumed that the TB #1 is divided into a part #1, a part #2, and a part #3 after being encoded. In this case, the part #1 and the part #2 may be sent in the BWP #1, and the part #3 may be sent in the BWP #2. Alternatively, the part #1 is sent in the BWP #1, and the part #2 and the part #3 are sent in the BWP #2.

It should be further noted that two active BWPs are used as an example for description above. This application is not limited thereto. For example, one BWP bundle includes a plurality of active BWPs, and a part or all of encoded data of the TB #1 may be transmitted on each active BWP.

It should be further noted that in the manner 1, one transmitted TB is scheduled by using one piece of DCI. With reference to (1) of FIG. 8, one piece of DCI includes one piece of RV information, transmission in a plurality of BWPs may be considered as a whole, and one piece of HARQ information needs to be fed back.

Manner 2

The TB #1 is encoded by using different RVs, and is sent in a plurality of configured active BWPs.

For details, refer to (2) of FIG. 8. It is assumed that the TB #1 is sent in the BWP #1 and the BWP #2, data #1 is obtained after the TB #1 is encoded by using an RV 1, the data #1 is sent in the BWP #1, data #2 is obtained after the TB #1 is encoded by using an RV 2, and the data #2 is sent in the BWP #2.

It should be noted that an example in which the TB #1 is encoded by using two different RVs is used for description above. This application is not limited thereto. For example, it is assumed that the TB #1 may be separately encoded by using an RV 1, an RV 2, and an RV 3. In this case, the TB #1 may be encoded by using the RV 1 and the RV 2 and then sent in the BWP #1, and the TB #1 is encoded by using the RV 3 and then sent in the BWP #2. Alternatively, the TB #1 may be encoded by using the RV 1 and then sent in the BWP #1, and the TB #1 is encoded by using the RV 2 and the RV 3 and then sent in the BWP #2.

It should be noted that two active BWPs are used as an example for description above. This application is not limited thereto. For example, one BWP bundle includes at least two active BWPs, and the TB #1 may be encoded by using different redundancy versions, and sent in active BWPs.

It should be further noted that in the manner 2, one piece of DCI simultaneously schedules a plurality of pieces of RV data of one TB, and data of one RV version is sent in each BWP. In this case, data on each BWP needs to have independent HARQ information.

A manner of generating a HARQ codebook includes a manner of generating a semi-static HARQ codebook and a manner of generating a dynamic HARQ codebook. The following separately describes a manner of generating a semi-static HARQ codebook and a manner of generating a dynamic HARQ codebook.

Semi-Static HARQ Codebook:

The semi-static HARQ codebook refers to a codebook generation mode in which a size of a HARQ codebook may be determined before data is sent, and does not vary with an actual data sending status. The size of the codebook may be determined based on some RRC parameter configurations or predefined parameters.

The semi-static HARQ codebook is generated in the following manner:

Step 1: Determine a candidate PDSCH receiving occasion set for an active DL BWP in a given serving cell.

It should be understood that in this embodiment of this application, PDSCHs at all possible positions may be used as candidate PDSCHs, and the candidate PDSCHs include a set of various candidate PDSCHs that are in all search space and configured by a network device.

Determining of the candidate PDSCH receiving occasion set is related at least to the following factors:

(1) A K1 value set associated with an active UL BWP.

A K1 value is related to that a terminal device is configured to monitor a DCI format. FIG. 8 is a schematic diagram of K1 values. A slot timing value K1 may also be referred to as a timing value from downlink data to feedback information of the downlink data, and a quantity of slots between the downlink data and the HARQ feedback information of the downlink data is used as a unit of the slot timing value. For example, a PUCCH for feeding back HARQ information is located in a slot n. K1=1 indicates that the PUCCH located in the slot n needs to include HARQ feedback information of a PDSCH in a slot n−1. By analogy, K1=2, 3, or 4 respectively indicates that the PUCCH in the slot n needs to include HARQ feedback information of a PDSCH in a slot n−2, n−3, or n−4. It should be noted that when a numerology of a DL BWP is different from a numerology of a UL BWP, as shown in FIG. 8, a slot unit corresponding to a K1 value is consistent with a slot unit of the UL BWP. In other words, K1=1 corresponds to a slot corresponding to one UL BWP. In the figure, a slot of one UL BWP corresponds to slots of a plurality of DL BWPs. As shown in the figure, a slot corresponding to K1=4 corresponds to four slots: a slot m, a slot m+1, a slot m+2, and a slot m+3. When the terminal is configured to monitor a DCI format 1_0, the K1 value set is a predefined set {1, 2, 3, 4, 5, 6, 7, 8}. When the terminal is configured to monitor a DCI format 1_1, the K1 value set is determined based on an RRC configuration parameter.

(2) PDSCH time domain resource allocation table (RRC configuration parameters associated with the active DL BWP). Main components of the time domain allocation table are shown in Table 2 below. In the table, a set of parameters for PDSCH time domain allocation are defined. Parameters in each row include a slot offset K0 between a PDCCH and a PDSCH, a PDSCH start symbol, a symbol length, and a PDSCH mapping type.

TABLE 2

| Index (index) | K0 | Start symbol (start symbol) | Symbol length | Type (type) |
| --- | --- | --- | --- | --- |
| 0 | 0 | 0 | 7 | A |
| 1 | 0 | 3 | 2 | B |
| 2 | 0 | 4 | 2 | B |
| 3 | 1 | 5 | 2 | B |
| 4 | 1 | 5 | 4 | B |
| 5 | 0 | 7 | 7 | B |

(3) Uplink and downlink semi-static configuration (including cell-level configuration and terminal-specific configuration).

Figure 9:
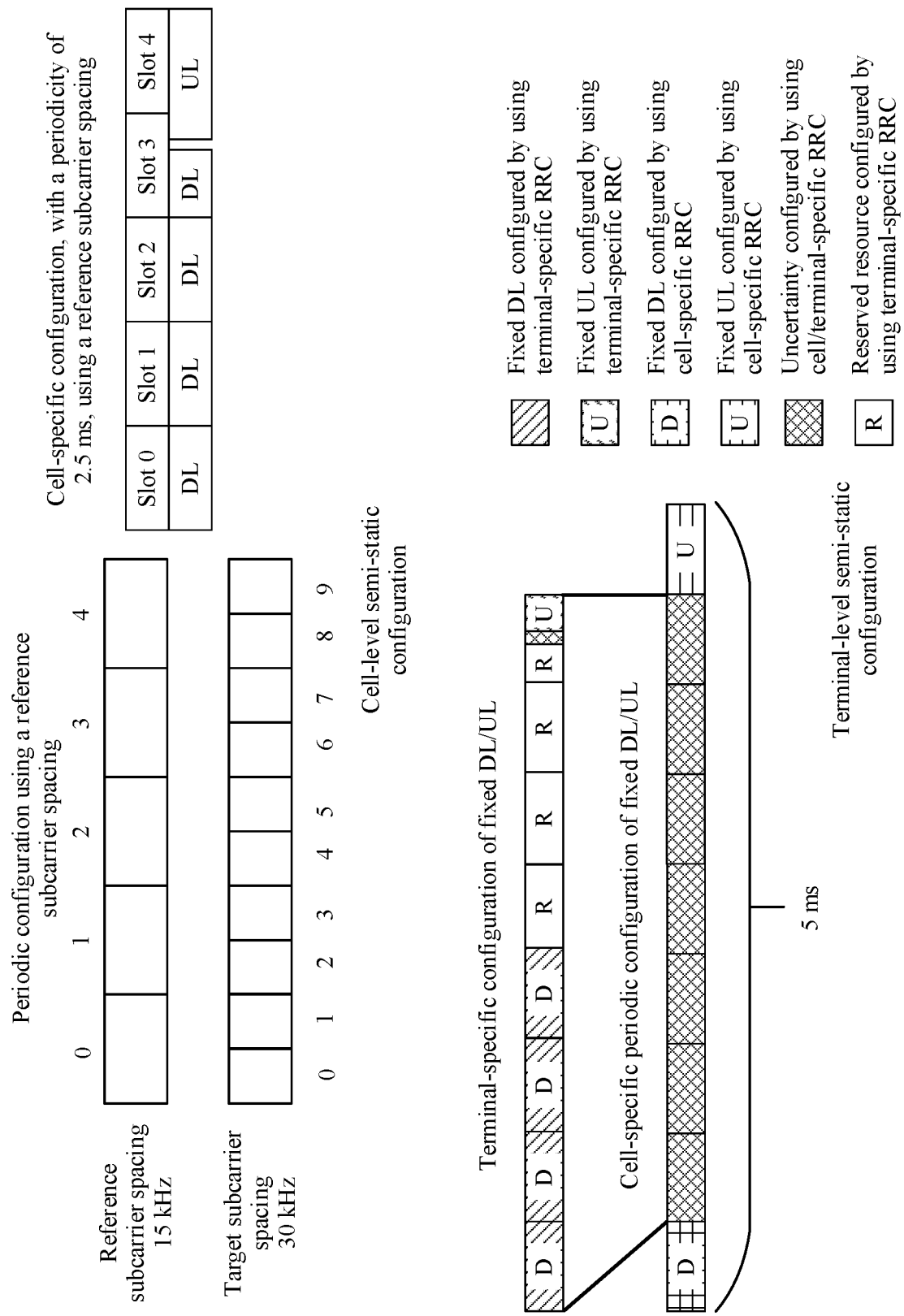
FIG. 9 is a schematic diagram of uplink and downlink semi-static configuration applicable to an embodiment of this application.

FIG. 9 is a schematic diagram of uplink and downlink semi-static configuration, including cell-level semi-static configuration and terminal-level semi-static configuration. In an NR system, to support flexible and dynamic TDD, a DL/UL transmission direction in each time unit (a slot, a symbol, or the like) may be configured by using higher layer signaling and/or physical layer group common DCI. In a possible implementation, one periodicity is configured. For example, in FIG. 9, a periodicity of cell-level configuration at the top is 2.5 ms and occupies a slot length corresponding to five 30 kHz subcarrier spacings; and a configuration periodicity in two sub-figures at the bottom is 5 ms. In this periodicity, some fixed time units may be configured for uplink UL transmission, some fixed time units may be configured for downlink DL transmission, or some reserved resources may be configured. A remaining resource/time unit in the periodicity may be flexibly and dynamically assigned as a DL, UL, or reserved/blank resource. As shown in FIG. 9, one DL time unit and one UL time unit are configured in the cell-level configuration, and other resources are reserved resources. However, a specific quantity of DL time units and UL time units are configured in the terminal-level configuration.

Determining of the candidate PDSCH receiving occasion set corresponding to each active BWP is related to parameters in (1), (2), and (3). A preliminary set of time units in which the candidate PDSCHs are located is first determined by using the K1 value set, then possible time units that are used to carry the PDSCHs and that are determined by using specific parameters in the PDSCH slot allocation table are compared with a time unit fixedly used for uplink transmission in the uplink and downlink semi-static configuration, and finally the candidate PDSCH receiving occasion set including a time unit, in the possible time units that are used to carry the PDSCHs, other than the time unit that is already configured for the uplink transmission is obtained.

Step 2: HARQ information of each serving cell is determined in sequence based on a sequence of the serving cell, and a final HARQ codebook is obtained after HARQ information of all serving cells is determined. For a terminal that is configured with CA, a quantity of serving cells is greater than or equal to 2. For a terminal that is not configured with CA, a quantity of serving cells is 1.

In addition to a size of the candidate PDSCH receiving occasion set in step 1, the size of the HARQ codebook is also related to a quantity of serving cells configured for the terminal, whether HARQ information space bundling is configured, a maximum quantity of codewords (codeword, CW) that can be scheduled by each piece of DCI (which is equivalent to a maximum quantity of transport blocks that can be scheduled in a same time unit), whether a CBG transmission mode is configured, and a quantity of code block groups (coded block group, CBG) included in a next transport block (transport block, TB) in the CBG transmission mode. In this embodiment of this application, for clarity, parameters related to HARQ codebook determining are collectively referred to as parameters #A (namely, an example of a parameter corresponding to a BWP combination). The parameters #A include the foregoing K1 value set parameter, the time domain allocation table, the uplink and downlink semi-static configuration, the maximum quantity of CWs supported by the DCI, the quantity of CBGs, whether the space bundling is performed, and the like.

The foregoing manner of generating the semi-static HARQ codebook is directed to a case in which one active BWP is configured in one cell. Therefore, when one cell includes a plurality of downlink carriers, or one downlink carrier includes a plurality of active DL BWPs, how to generate a HARQ codebook is described below. For the manner 1 mentioned in this embodiment of this application, namely, a manner of sending the TB #1 in the plurality of active BWPs in the BWP combination, the following describes in detail how to generate a semi-static HARQ codebook when a BWP combination is configured.

The following describes how to generate a semi-static HARQ codebook in three cases.

Case 1

An example in which one BWP bundle is configured for one terminal device in one serving cell is used.

Figure 10:
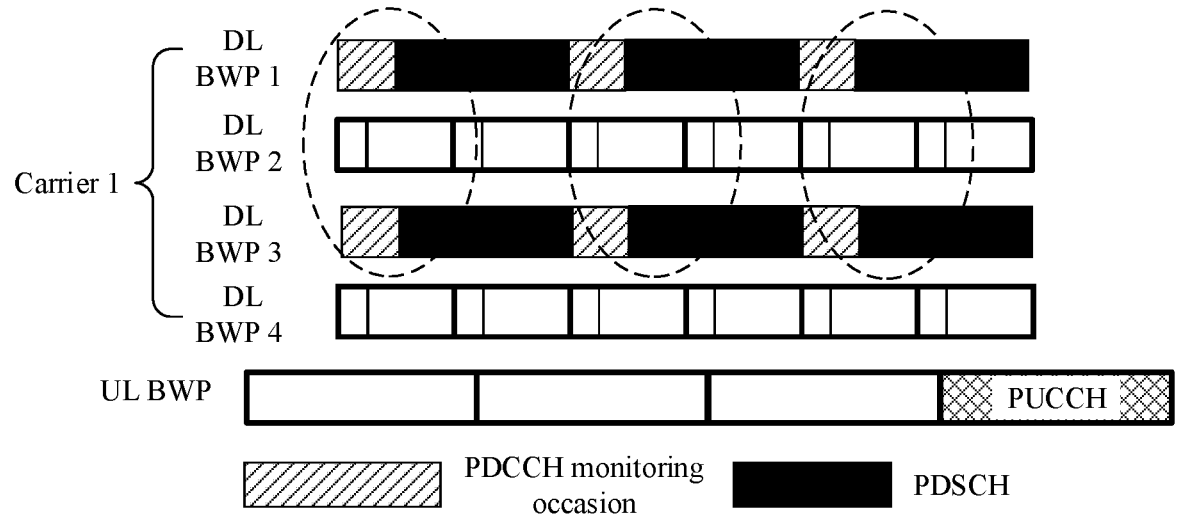
FIG. 10 is a schematic diagram of configuring a BWP bundle applicable to an embodiment of this application.

As shown in FIG. 10, one BWP bundle is configured for one terminal device. Semi-static configuration of the BWP bundle may be understood as that a BWP forming the BWP bundle does not change within a specific period of time, and composition of the BWP bundle can be changed only through reconfiguration by using RRC signaling. For example, the configuration may be delivered by a network device to the terminal by using the RRC signaling. A plurality of BWPs in the BWP bundle may be considered as a whole, and there should be a set of unified parameters #A (namely, an example of a parameter corresponding to a BWP combination) when HARQ information is generated. Optionally, the unified parameters #A may be a parameter corresponding to at least one of the plurality of active BWPs, or a predefined parameter.

Specifically, the unified parameters #A may be determined by using at least any one of the following methods.

Method #1

The network device configures unified parameters for each active BWP in the BWP bundle. In other words, when configuring the BWP bundle, the network device configures related parameters of the plurality of BWPs in the BWP bundle as same values. Optionally, the related parameters of the BWPs include at least one of the K1 value set, the time domain allocation table, the uplink and downlink semi-static configuration, the maximum quantity of CWs supported by the DCI, the quantity of CBGs, and whether the space bundling is performed.

Method #2

The network device configures parameters for active BWPs in the BWP bundle, and at least one of these BWP-related parameters is different. Parameters corresponding to any one of the plurality of active BWPs are selected as unified BWP parameters. Specifically, when the network device configures the BWP bundle, at least one of related parameters of the plurality of active BWPs in the BWP bundle is different. The terminal device selects parameters of a BWP in the BWP bundle as unified BWP bundle parameters, namely, unified parameters #A, based on a predefined criterion or an indication of the network device. For example, it is assumed that one BWP bundle includes two active BWPs that are denoted as a BWP #1 and a BWP #2, and the BWP #1 and the BWP #2 each correspond to a set of parameters #A. In this case, the parameters #A corresponding to the BWP #1 or the parameters #A corresponding to the BWP #2 may be used as unified parameters #A. Specifically, it is assumed that a K1 value set corresponding to the BWP #1 is {1, 2, 3, 4}, a K1 value set corresponding to the BWP #2 is {5, 6, 7, 8}, and other related parameters of the BWP #1 and the BWP #2 are the same. If it is predefined that a BWP parameter having a smallest BWP sequence number is selected as a unified parameter, a K1 value set in the unified parameters of the BWP bundle is the K1 value set corresponding to the BWP #1, namely, {1, 2, 3, 4}. If the network device additionally specifies a reference BWP sequence number (for example, indicates that a reference BWP is the BWP #2) by using indication information, a K1 value set in the unified parameters of the BWP bundle is the K1 value set corresponding to the BWP #2, namely, {5, 6, 7, 8}.

Method #3

The network device configures parameters for active BWPs in the BWP bundle, and at least one of these BWP-related parameters is different. Unified BWP parameters are generated by comprehensively considering the parameters of the plurality of active BWPs. When the network device configures the BWP bundle, parameters #A of the plurality of BWPs in the BWP bundle are different, and unified parameters #A are generated based on the parameters #A of the plurality of BWPs in the BWP bundle. For example, for a K1 value set parameter, a union set of K1 value sets of some or all of the BWPs in the BWP bundle is selected as a parameter #A. For a maximum quantity of CWs supported by DCI in each of the plurality of BWPs in the BWP bundle, a maximum quantity of CWs in the plurality of BWPs may be used as a unified parameter #A. Specifically, one BWP bundle includes two active BWPs that are denoted as a BWP #1 and a BWP #2. A K1 value set corresponding to the BWP #1 is {1, 2, 3, 4}, and a maximum quantity of CWs indicated by DCI is 1. A K1 value set corresponding to the BWP #2 is {5, 6, 7, 8}, and a maximum quantity of CWs indicated by DCI is 2. Therefore, a K1 value set corresponding to the unified BWP parameters is {1, 2, 3, 4, 5, 6, 7, 8} (which is a union set of sets {1, 2, 3, 4} and {5, 6, 7, 8}, or is referred to as a union set), and a maximum quantity of CWs supported by DCI corresponding to the unified BWP parameters is Max(1, 2)=2.

Optionally, for a time domain resource allocation table, a row with a same time domain configuration in time domain resource allocation tables of some or all of the BWPs in the BWP bundle is selected as a parameter #A. Specifically, one BWP bundle includes two active BWPs that are denoted as a BWP #1 and a BWP #2. The following Table 3 and Table 4 respectively represent a time domain resource allocation table of the BWP #1 and a time domain resource allocation table of the BWP #2, and a parameter #A (refer to Table 5) is finally determined after a same time domain configuration is selected. It should be noted that in this case, index values in the time domain resource allocation table need to be re-sorted.

TABLE 3

| Index (index) | K0 | Start symbol (start symbol) | Symbol length | Type (type) |
|---|---|---|---|---|
| 0 | 0 | 2 | 7 | A |
| 1 | 0 | 3 | 2 | B |
| 2 | 0 | 4 | 2 | B |
| 3 | 1 | 5 | 2 | B |

TABLE 4

| Index (index) | K0 | Start symbol (start symbol) | Symbol length | Type (type) |
|---|---|---|---|---|
| 0 | 0 | 0 | 7 | A |
| 1 | 0 | 3 | 2 | B |
| 2 | 0 | 4 | 2 | B |
| 3 | 1 | 7 | 2 | B |

TABLE 5

| Index (index) | K0 | Start symbol (start symbol) | Symbol length | Type (type) |
|---|---|---|---|---|
| 0 | 0 | 3 | 2 | B |
| 1 | 0 | 4 | 2 | B |

It should be noted that for ease of description, a quantity of CWs of a BWP in this specification is a maximum quantity of CWs that can be scheduled by each piece of DCI in the BWP (which is equivalent to a maximum quantity of transport blocks that can be scheduled in a same time unit). In this specification, the space bundling is HARQ information space bundling.

In this embodiment of this application, the unified parameters #A may be determined by using the foregoing three methods. After the unified parameters #A are determined, a PDSCH receiving occasion set corresponding to the BWP bundle may be determined based on the unified parameters #A. For example, a set of time units in which the candidate PDSCHs are located is determined by using the K1 value set, then time units that are used for the PDSCHs and that are determined by using specific parameters in the PDSCH slot allocation table are compared with a time unit fixedly used for uplink transmission in the uplink and downlink semi-static configuration, and finally the PDSCH receiving occasion set including a time unit, in the time units that are used for the PDSCHs, other than the time unit that is already configured for the uplink transmission is obtained.

Then, the terminal device may generate, based on the PDSCH receiving occasion set, HARQ information corresponding to the BWP bundle. The HARQ information is a semi-static HARQ codebook.

Optionally, the network device sends a second message to the terminal device. The second message is used to indicate at least one of the following: a quantity of CWs of the active BWP in the BWP bundle, a quantity of CBGs of the active BWP in the BWP bundle, and space bundling indication information. The terminal device determines a quantity of bits of the HARQ information based on the second message. Optionally, the quantity of bits of the HARQ information corresponding to the BWP bundle is determined based on a maximum value of the quantity of CWs or CBGs of all the active BWPs included in the BWP bundle. Information used to indicate the quantity of CWs or CBGs of the active BWP and information used to indicate the BWP bundle may be RRC information.

It should be noted that the foregoing listed three methods are examples for description, and this application is not limited thereto. Any method that can enable the BWP bundle to correspond to a set of unified parameters #A falls within the protection scope of the embodiments of this application.

Case 2

In one serving cell, a plurality of BWP bundles may be configured for one terminal device, and the BWP bundles are semi-statically configured.

Figure 11:
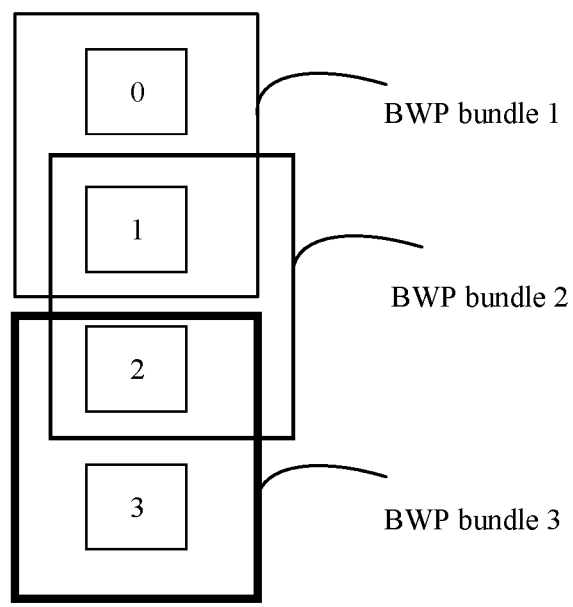
FIG. 11 is a schematic diagram of configuring a plurality of overlapping BWP bundles applicable to an embodiment of this application.

As shown in FIG. 11, a plurality of BWP bundles may be configured for one terminal device, and BWPs included in the plurality of BWP bundles may not overlap each other, or may partially overlap. Without loss of generality, a case of partial overlapping is used as an example. As shown in FIG. 11, a BWP bundle 1 includes a BWP 0 and a BWP 1, a BWP bundle 2 includes the BWP 1 and a BWP 2, and a BWP bundle 3 includes the BWP 2 and a BWP 3. The BWP bundles are semi-statically configured. To be specific, the BWPs included in the BWP bundle 1, the BWP bundle 2, and the BWP bundle 3 do not change within a specific period of time, and different transport blocks may be transmitted at different times. Therefore, when these BWP bundles are semi-statically configured, compared with the case 1 in which a single BWP bundle is configured, it is equivalent to that a plurality of parallel candidate PDSCH receiving occasions are added in frequency domain in one serving cell. Therefore, a two-dimensional candidate PDSCH receiving occasion set in frequency domain and time domain needs to be calculated. A specific calculation method may be determined by using at least any one of the following methods.

It should be noted that parameters corresponding to the plurality of BWP bundles may be consistent, or may be independent of each other (which may be different). This is not limited in the present invention.

Method 1

A candidate PDSCH receiving occasion set is determined in a sequence of frequency domain first and time domain next.

Specifically, the terminal device first uses the first value in the K1 value set to calculate a quantity of candidate frequency domain positions of the plurality of BWP bundles. Optionally, a quantity of non-overlapping frequency domain positions needs to be calculated. As shown in FIG. 11, a quantity of non-overlapping frequency domain positions is 2 (which respectively correspond to the BWP bundle 1 and the BWP bundle 3). According to this method, all values in the K1 value set are sequentially used. A different candidate PDSCH receiving occasion in frequency domain is calculated for each K1 value. Finally, all candidate PDSCH receiving occasion sets corresponding to the plurality of BWP bundles in a HARQ feedback window are obtained. It should be noted that in a same time unit, a quantity of candidate PDSCH receiving occasions in different frequency domains is equivalent to a quantity of non-overlapping BWP bundles in frequency domain.

A K1 value set in each BWP bundle may be determined based on a K1 value set corresponding to at least one of a plurality of active BWPs in the BWP bundle, or may be a K1 value set corresponding to at least one of the plurality of BWP bundles, a K1 value set preconfigured by the network device for the BWP bundle, or a unified K1 value set. Slot allocation tables corresponding to different BWP bundles may be different, or may be uniformly the same.

Method 2

A candidate PDSCH receiving occasion set is determined in a sequence of time domain first and frequency domain next.

Specifically, the terminal device first selects a frequency domain position of a BWP bundle, and calculates all corresponding candidate PDSCH receiving occasions in the K1 value set one by one. Then, the terminal device selects a frequency domain position of a next BWP bundle, and similarly, calculates all corresponding candidate PDSCH receiving occasions in the K1 value set one by one. The frequency domain position of the BWP bundle may be selected in ascending order or in descending order of BWP bundle indexes. Optionally, the frequency domain position of the BWP bundle is a quantity of non-overlapping positions. Finally, all candidate PDSCH receiving occasion sets corresponding to the plurality of BWP bundles are obtained. It should be noted that in a same time unit, a quantity of candidate PDSCH receiving occasions in different frequency domains is equivalent to a quantity of non-overlapping BWP bundles in frequency domain.

A K1 value set in each BWP bundle may be determined based on a K1 value set corresponding to at least one of a plurality of active BWPs in the BWP bundle, or may be a K1 value set corresponding to at least one of the plurality of BWP bundles, a K1 value set preconfigured by the network device for the BWP bundle, or a unified K1 value set. Slot allocation tables corresponding to different BWP bundles may be different, or may be uniformly the same.

Method 3

A candidate PDSCH receiving occasion set is determined in a manner of first separately performing calculation in time domain and frequency domain, and then separately performing multiplication.

The terminal device first calculates a quantity of candidate PDSCH receiving occasion sets in frequency domain based on a frequency domain position configured for a BWP bundle, and calculates a quantity of PDSCH receiving occasion sets in time domain of each BWP bundle based on a K1 value set corresponding to each BWP bundle, a time domain allocation table, and uplink and downlink semi-static configuration. Then, the terminal device multiplies the quantity of PDSCH receiving occasion sets in frequency domain by the quantity of PDSCH receiving occasion sets in time domain to obtain PDSCH receiving occasion sets corresponding to the plurality of BWP bundles. It should be noted that in a same time unit, a quantity of candidate PDSCH receiving occasions in different frequency domains is equivalent to a quantity of non-overlapping BWP bundles in frequency domain. Optionally, in BWP bundle semi-static configuration, a quantity of PDSCH receiving occasions in frequency domain is fixed before the BWP bundle is reconfigured.

Specifically, FIG. 11 is used as an example. When the BWP bundles shown in the figure are semi-statically configured, a quantity of non-overlapping BWP bundles is 2. When a quantity of PDSCH receiving occasion sets of the BWP bundle 1 in time domain is N1, a quantity of PDSCH receiving occasion sets of the BWP bundle 2 in time domain is N2, and a quantity of PDSCH receiving occasion sets in time domain of the BWP bundle 3 is N3, a total quantity of PDSCH receiving occasions is finally 2*(N1+N3).

The candidate PDSCH receiving occasion sets of the plurality of BWP bundles in a semi-static configuration case may be determined by using the foregoing three methods, and then HARQ information may be generated based on the candidate PDSCH receiving occasion sets of the plurality of BWP bundles.

It should be noted that in the foregoing three methods for calculating the quantity of candidate PDSCH receiving occasion sets, the quantity of PDSCH receiving occasions in frequency domain is calculated based on the quantity of non-overlapping BWP bundles.

It should be further noted that for a BWP bundle, a maximum value of quantities of CWs corresponding to all of the plurality of active BWPs included in the BWP bundle may be used as a quantity of CWs used to calculate a quantity of bits of HARQ information corresponding to the BWP bundle.

It should be further noted that in this embodiment of this application, "parameters of a BWP bundle", "unified parameters of a BWP bundle", and "unified parameters #A" are usually interchangeably used, but meanings of "parameters of a BWP bundle", "unified parameters of a BWP bundle", and "unified parameters #A" may be understood by a person skilled in the art. "Parameters of a BWP bundle", "unified parameters of a BWP bundle", and "unified parameters #A" are all used to indicate a set of unified parameters #A used to determine the HARQ codebook for the BWP bundle.

Case 3

In one serving cell, a plurality of BWP bundles may be configured for one terminal device, and the BWP bundles are dynamically configured. Dynamic configuration of a BWP bundle may be understood as that BWPs included in the BWP bundle may dynamically change in different time units.

As shown in FIG. 11, four BWPs are configured. In a time unit, in a time period, a BWP 0 and a BWP 1 may form a BWP bundle 1, the BWP 1 and a BWP 2 may form a BWP bundle 2, and the BWP 2 and a BWP 3 may form a BWP bundle 3. In another time unit, there may be another combination. For example, the BWP 0 and the BWP 2 may form a BWP bundle 1, the BWP 1 and the BWP 3 may form a BWP bundle 2, and the BWP 1 and the BWP 3 may form a BWP bundle 3. Alternatively, the BWP 0, the BWP 1, and the BWP 2 form a BWP bundle. Therefore, when the plurality of BWP bundles may be configured for the terminal device in the serving cell, and the BWP bundles are dynamically configured, compared with the case 1 in which a single BWP bundle is configured, it is equivalent to that a plurality of parallel PDSCH receiving occasions that vary with time in frequency domain are further added in frequency domain of the serving cell. Compared with a semi-static configuration case, a quantity of BWP bundles in frequency domain changes in a HARQ feedback window (K1 set). When determining a semi-static HARQ codebook, optionally, the terminal device determines a maximum quantity of BWP bundles in the feedback window based on BWP bundle dynamic configuration signaling. The terminal device determines, based on the maximum quantity of BWP bundles in the HARQ feedback window, PDSCH receiving occasion sets corresponding to all the BWP bundles. The terminal device generates HARQ information based on the PDSCH receiving occasion sets corresponding to the plurality of BWP bundles. In other words, when a semi-static HARQ codebook is determined, a maximum quantity of BWP bundles that can be configured in the feedback window may be used in frequency domain, and a union set (which is also referred to as a union set) of K1 value sets of a plurality of BWPs in the BWP bundles may be used in time domain. When the HARQ information is generated, a size of the HARQ codebook is calculated based on a maximum quantity of CWs of BWPs in the plurality of BWP bundles.

Dynamic HARQ Codebook:

The dynamic HARQ codebook is a codebook generation mode in which a HARQ codebook dynamically changes based on an actual data scheduling status.

A manner of generating a dynamic codebook is implemented by using a counter DAI (counter DAI, C-DAI) and a total DAI (total DAI, T-DAI) included in DCI. The C-DAI is included in a DCI format 1_0 or a DCI format 1_1, and indicates an accumulative quantity of {serving cell, PDCCH monitoring occasion}-pairs (pair) in which a PDSCH scheduled by using the DCI format 1_0 or the DCI format 1_1 or downlink SPS release indicated by the DCI format 1_0 is present up to a current serving cell and a current PDCCH monitoring occasion. Accumulation is performed first in a sequence of serving cell indexes and then in a sequence of PDCCH monitoring occasion indexes. The T-DAI is included in the DCI format 1_1, and indicates a total quantity of {serving cell, PDCCH monitoring occasion}-pairs in which a PDSCH scheduled by using the DCI format 1_0 or the DCI format 1_1 or downlink SPS release indicated by the DCI format 1_0 is present up to the current PDCCH monitoring occasion. The total quantity may be updated on each PDCCH monitoring occasion.

Figure 12:
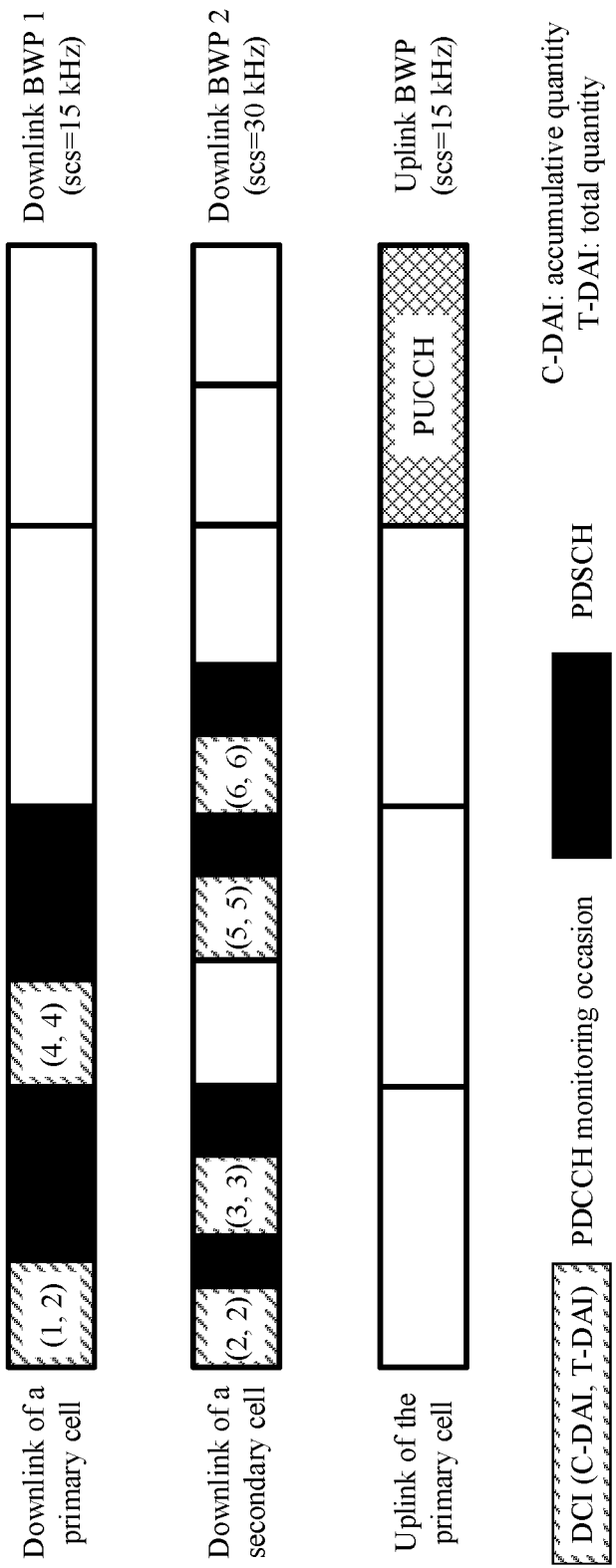
FIG. 12 is a schematic diagram of a manner of calculating a dynamic HARQ codebook.

Specifically, descriptions are provided with reference to FIG. 12. FIG. 12 shows a manner of calculating a dynamic HARQ codebook in the current technology. As shown in FIG. 12, a dynamic HARQ codebook is generated based on a counter DAI and a total DAI of {serving cell, PDCCH monitoring occasion}-pairs. Counting is performed by using a start time of the PDCCH monitoring occasion as a reference, and is performed first in a sequence of serving cell sequence numbers and then in a sequence of PDCCH monitoring occasions.

Figure 13:
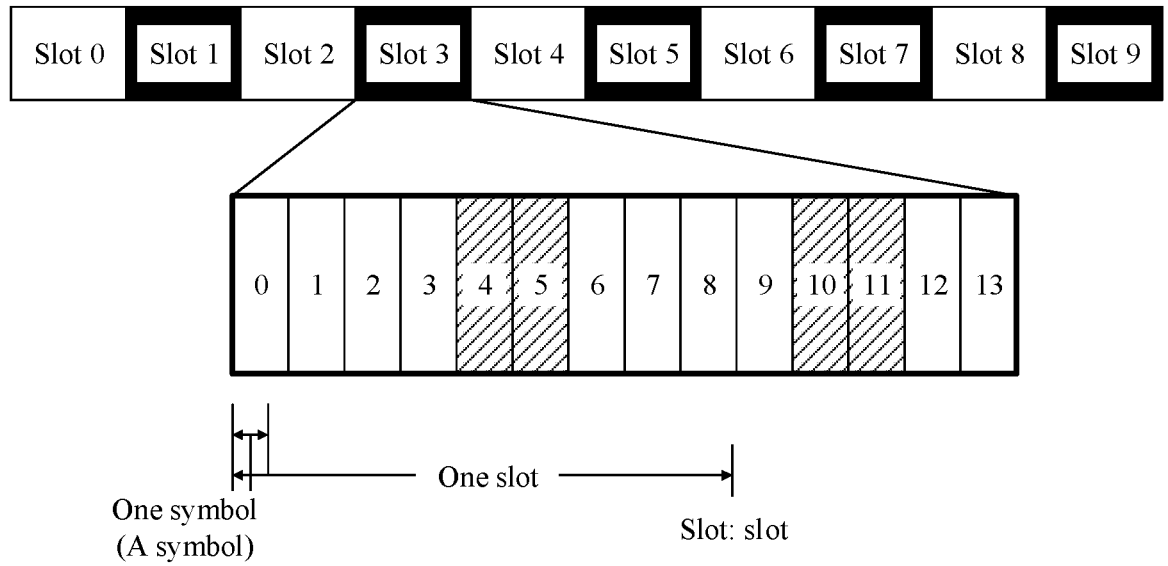
FIG. 13 is a schematic diagram of a PDCCH monitoring occasion applicable to an embodiment of this application.

The PDCCH monitoring occasion (PDCCH monitoring occasion) is a time unit used to monitor a PDCCH, and related parameters are provided in configurations of search space. The PDCCH monitoring occasion is determined based on three parameters configured through RRC: a PDCCH monitoring periodicity, a PDCCH monitoring offset, and a PDCCH monitoring mode. As shown in FIG. 13, a PDCCH monitoring periodicity is two slots, an offset value is 1, and slots in which monitoring needs to be performed correspond to slot positions in black parts in the figure. Further, the PDCCH monitoring mode is used to indicate a position of a PDCCH monitoring occasion in a slot. In the PDCCH monitoring mode, a 14-bit bitmap (bitmap) is used to indicate a position of a symbol that needs to be monitored. In the figure, a 14-bit indication is a binary number (00001100001100), and each bit represents a position of one symbol, where 1 indicates that monitoring is required, and 0 indicates that monitoring is not required. In this way, symbols 4, 5, 10, and 11 in a slot corresponding to the black part in the figure need to be monitored.

In the foregoing manner of calculating a dynamic codebook, a case in which one cell includes a plurality of downlink carriers, or one downlink carrier includes a plurality of active DL BWPs is not considered.

Based on this, an embodiment of this application provides a method for generating a HARQ codebook, and counting of a C-DAI and a T-DAI is jointly determined by using a BWP bundle ID and a serving cell ID in frequency domain.

Optionally, a network device sends DCI to a terminal device. The DCI includes information about a C-DAI, and the C-DAI is determined based on a cell, a BWP bundle ID, and a PDCCH monitoring occasion. The terminal device generates HARQ information based on the information about the C-DAI.

Optionally, the DCI may further include information about a T-DAI. The T-DAI is determined based on a cell, a BWP bundle ID, and a PDCCH monitoring occasion. The terminal device may generate the HARQ information based on the C-DAI and the T-DAI.

Specifically, in this embodiment of this application, an existing two-dimensional variable statistical count of {serving cell, PDCCH monitoring occasion} may be extended to a statistical count of three parameters: {serving cell, BWP bundle ID, PDCCH monitoring occasion}. The method can be applied to a scenario in which one cell includes a plurality of downlink carriers, or one downlink carrier includes a plurality of active DL BWPs. In a possible manner, when the C-DAI or the T-DAI is counted based on {serving cell, BWP bundle ID, PDCCH monitoring occasion}, sorting of BWP bundle IDs may be added in frequency domain in the serving cell.

It should be noted that, when the serving cell includes the plurality of downlink carriers, a dynamic HARQ codebook is generated, and the C-DAI and the T-DAI are counted, sorting of carrier indexes may be further added in frequency domain.

The foregoing describes, with reference to FIG. 7 to FIG. 13 and the BWP bundle, the method for generating HARQ information provided in the embodiments of this application. The following describes, with reference to another case of the BWP combination, the method for generating HARQ information provided in the embodiments of this application.

Figure 14:
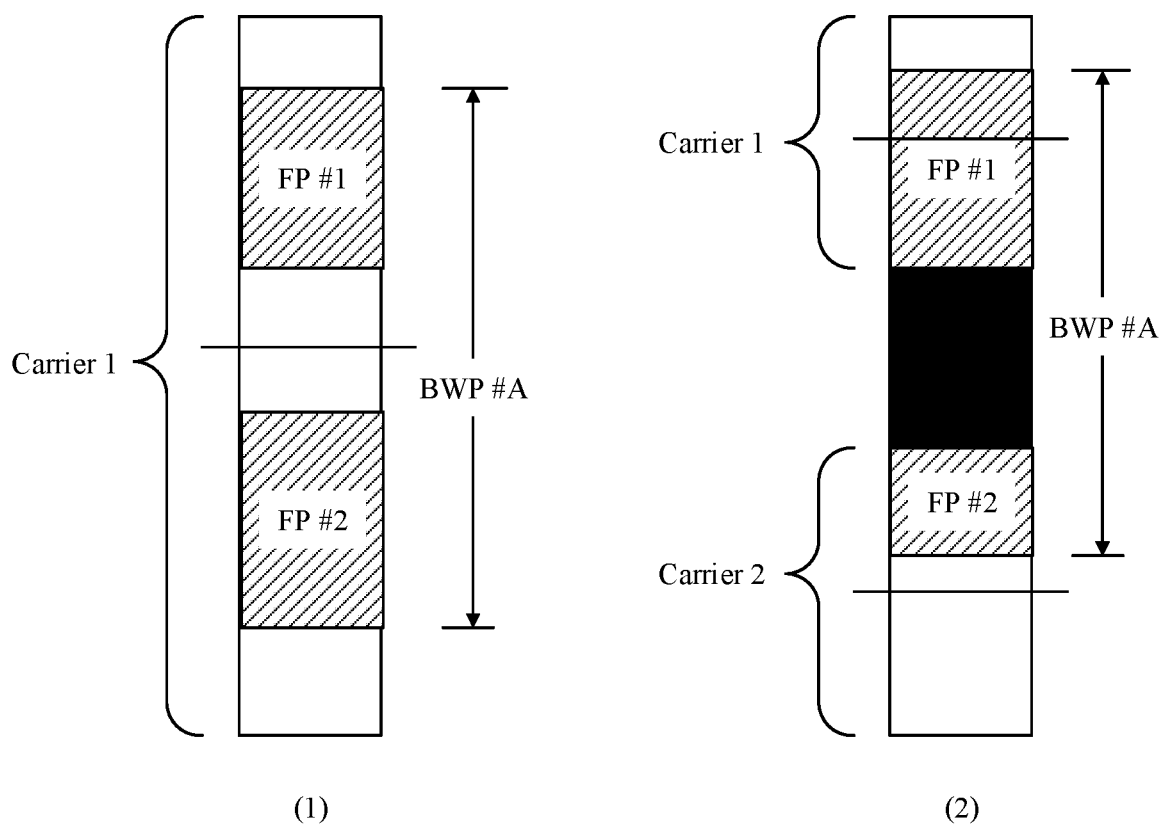
FIG. 14 is a schematic diagram of a BWP combination applicable to an embodiment of this application.

FIG. 14 is a schematic diagram of a BWP combination (namely, a BWP #A). The BWP #A includes at least two FPs, and different FPs may be located on a same carrier, or may be located on different carriers. As shown in FIG. 14, in a serving cell, a TB is sent in an FP #1 and an FP #2. The FP #1 and the FP #2 may be located on a same carrier. As shown in (1) of FIG. 14, the FP #1 and the FP #2 are located on a carrier 1. The FP #1 and the FP #2 may alternatively be located on different carriers. As shown in (2) of FIG. 14, the FP #1 is located on a carrier 1, and the FP #2 is located on a carrier 2. A BWP bundle may also be considered as a BWP #A.

A manner of generating a HARQ codebook includes a manner of generating a semi-static codebook and a manner of generating a dynamic codebook, and is similar to that in the foregoing embodiment. The following separately describes a manner of generating a semi-static codebook and a manner of generating a dynamic codebook.

Semi-Static HARQ Codebook:

According to a definition of the BWP #A, different FP parts in the BWP #A are not independent BWPs. Therefore, during parameter configuration, the BWP #A is configured as a whole. In other words, the BWP #A corresponds to a set of unified parameters #A. For example, there is a K1 value set corresponding to the BWP #A, a time domain allocation table, and configuration of a quantity of CWs.

When one serving cell configures one BWP #A for one terminal device, a manner of generating a semi-static HARQ codebook is similar to an existing method for generating a semi-static HARQ codebook, and existing parameters #A of a BWP need to be replaced with the parameters #A of the BWP #A.

When one serving cell can configure a plurality of BWPs #A for one terminal device, a manner of generating a semi-static HARQ codebook may be separately described from two cases: whether the plurality of BWPs #A are semi-statically configured or dynamically configured.

It should be noted that parameters corresponding to the plurality of BWPs #A may be consistent, or may be independent of each other. This is not limited in the present invention.

In one case, the plurality of BWPs #A are semi-statically configured. In this case, a quantity of candidate PDSCH receiving occasion sets may be calculated by using at least any one of the following methods.

Method 1

A candidate PDSCH receiving occasion set is determined in a sequence of frequency domain first and time domain next.

Specifically, the terminal device first uses the first value in the K1 value set to calculate a quantity of candidate frequency domain positions of the plurality of BWPs #A. Optionally, a quantity of non-overlapping positions in frequency domain needs to be calculated. According to this method, all values in the K1 value set are sequentially used. A different candidate PDSCH receiving occasion in frequency domain is calculated for each K1 value. Finally, all candidate PDSCH receiving occasion sets corresponding to the plurality of BWPs #A in a HARQ feedback window are obtained. It should be noted that in a same time unit, a quantity of candidate PDSCH receiving occasions in different frequency domains is equivalent to a quantity of non-overlapping BWPs #A in frequency domain.

A K1 value set in each BWP #A may be determined based on a K1 value set corresponding to the BWP #A, or may be a K1 value set corresponding to at least one of the plurality of BWPs #A, a K1 value set preconfigured by the network device for the BWP #A, or a unified K1 value set. Slot allocation tables corresponding to different BWPs #A may be different, or may be uniformly the same.

Method 2

A candidate PDSCH receiving occasion set is determined in a sequence of time domain first and frequency domain next.

Specifically, the terminal device first selects a frequency domain position of a BWP #A, and calculates all corresponding candidate PDSCH receiving occasions in the K1 value set one by one. Then, the terminal device selects a frequency domain position of a next BWP #A, and similarly, calculates all corresponding candidate PDSCH receiving occasions in the K1 value set one by one. The frequency domain position of the BWP #A may be selected in ascending order or in descending order of BWP #A indexes. Optionally, the frequency domain position of the BWP #A is a quantity of non-overlapping positions. Finally, all candidate PDSCH receiving occasion sets corresponding to the plurality of BWPs #A are obtained. It should be noted that in a same time unit, a quantity of candidate PDSCH receiving occasions in different frequency domains is equivalent to a quantity of non-overlapping BWPs #A in frequency domain.

A K1 value set in each BWP #A may be a K1 value set corresponding to at least one of the plurality of BWPs #A, a K1 value set preconfigured by the network device for the BWP #A, or a unified K1 value set. Slot allocation tables corresponding to different BWPs #A may be different, or may be uniformly the same.

Method 3

A candidate PDSCH receiving occasion set is determined in a manner of first separately performing calculation in time domain and frequency domain, and then separately performing multiplication.

The terminal device first calculates a quantity of candidate PDSCH receiving occasion sets in frequency domain based on a frequency domain position configured for a BWP #A, and calculates a quantity of PDSCH receiving occasion sets in time domain of each BWP #A based on a K1 value set corresponding to each BWP #A, a time domain allocation table, and uplink and downlink semi-static configuration. Then, the terminal device multiplies the quantity of PDSCH receiving occasion sets in frequency domain by the quantity of PDSCH receiving occasion sets in time domain to obtain PDSCH receiving occasion sets corresponding to the plurality of BWPs #A. It should be noted that in a same time unit, a quantity of candidate PDSCH receiving occasions in different frequency domains is equivalent to a quantity of non-overlapping BWPs #A in frequency domain. Optionally, in BWP #A semi-static configuration, a quantity of PDSCH receiving occasions in frequency domain is fixed before the BWP #A is reconfigured.

In this case, a manner of generating a semi-static HARQ codebook is similar to that in the case 2 in the BWP bundle. For brevity, details are not described herein again.

In another case, the plurality of BWPs #A are dynamically configured. In this case, a quantity of BWPs #A in frequency domain changes in a HARQ feedback window (K1 set). When determining a semi-static HARQ codebook, optionally, the terminal device determines a maximum quantity of BWPs #A (namely, an example of T) in the HARQ feedback window based on BWP #A dynamic configuration signaling. The terminal device determines, based on the maximum quantity of BWPs #A in the HARQ feedback window, PDSCH receiving occasion sets corresponding to all the BWPs #A. The terminal device generates HARQ information based on the PDSCH receiving occasion sets corresponding to the plurality of BWPs #A. In other words, when a semi-static HARQ codebook is determined, a maximum quantity of BWPs #A that can be configured in the feedback window may be used in frequency domain, and K1 value sets corresponding to the BWPs #A may be used in time domain. When the HARQ information is generated, a size of the HARQ codebook is calculated based on a maximum quantity of CWs of BWPs in the plurality of BWPs #A.

In this case, a manner of generating a semi-static HARQ codebook is similar to that in the case 3 in the BWP bundle. For brevity, details are not described herein again.

Dynamic HARQ Codebook:

A manner of generating the dynamic HARQ codebook is to extend an existing two-dimensional variable statistical count of {serving cell, PDCCH monitoring occasion} to a statistical count of three parameters: {serving cell, BWP #A ID, PDCCH monitoring occasion}. The method can be applied to a scenario in which one cell includes a plurality of downlink carriers, or one carrier includes a plurality of active DL BWPs. Optionally, the network device sends DCI to the terminal device. The DCI includes information about a C-DAI, and the C-DAI is determined based on a cell, a BWP #A ID, and a PDCCH monitoring occasion. The terminal device generates HARQ information based on the information about the C-DAI.

Optionally, the DCI may further include information about a T-DAI. The T-DAI is determined based on a cell, a BWP #A ID, and a PDCCH monitoring occasion. The terminal device may generate the HARQ information based on the C-DAI and the T-DAI.

It should be noted that, when the serving cell includes the plurality of downlink carriers, a dynamic HARQ codebook is generated, and the C-DAI and the T-DAI are counted, sorting of carrier indexes may be further added in frequency domain.

Based on the foregoing technical solutions, when the serving cell is extended and includes the plurality of downlink carriers, or the carrier includes the plurality of active downlink BWPs or a plurality of active uplink BWPs, the terminal device may generate the HARQ information based on the unified parameters corresponding to the plurality of active BWPs. In other words, when the network device configures a plurality of active BWPs for the terminal device, where the plurality of active BWPs may be considered as one BWP combination, and the BWP combination corresponds to one set of unified parameters, the network device may send, to the terminal device, information indicating the BWP combination, and then the terminal device generates the HARQ information based on the parameters corresponding to the BWP combination.

The foregoing describes in detail the method for generating HARQ information according to the embodiments of this application with reference to FIG. 1 to FIG. 14. The following describes in detail an apparatus for generating HARQ information according to embodiments of this application with reference to FIG. 15 to FIG. 17.

Figure 15:
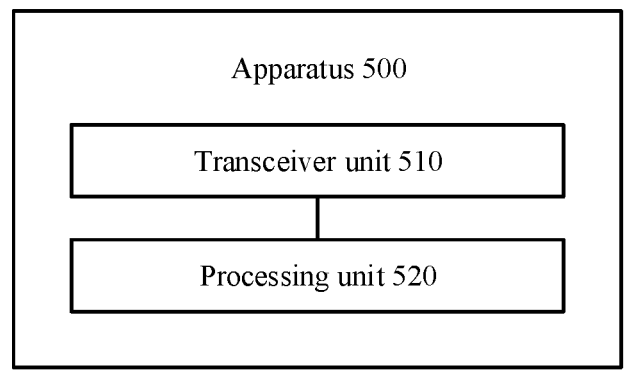
FIG. 15 is a schematic block diagram of an apparatus for generating HARQ information according to an embodiment of this application.

FIG. 15 is a schematic block diagram of an apparatus for generating HARQ information according to an embodiment of this application. As shown in FIG. 15, the apparatus 500 may include a transceiver unit 510 and a processing unit 520.

In a possible design, the apparatus 500 may be a terminal device or a chip disposed in a terminal device.

In a possible implementation, the transceiver unit 510 is configured to receive a first message sent by a network device, where the first message is used to indicate that there is a bandwidth part BWP combination in a cell, and the BWP combination includes an active BWP. The processing unit 520 is configured to generate HARQ information based on a parameter corresponding to the BWP combination.

Optionally, at least two active BWPs in the BWP combination are used to transmit a same transport block.

Optionally, a plurality of active BWPs in the BWP combination are located on different carriers of the cell.

Optionally, the processing unit 520 is specifically configured to: determine, based on the parameter corresponding to the BWP combination, a physical downlink shared channel PDSCH receiving occasion set corresponding to the BWP combination; and generate the HARQ information based on the PDSCH receiving occasion set corresponding to the BWP combination.

Optionally, the parameter corresponding to the BWP combination includes a parameter corresponding to at least one of the plurality of active BWPs, or a predefined parameter.

Optionally, the processing unit 520 is further configured to: obtain a quantity of frequency domain positions of a plurality of BWP combinations based on a slot timing value K1 value set, and determine PDSCH receiving occasion sets corresponding to the plurality of BWP combinations; or the processing unit 520 is further configured to obtain, based on frequency domain positions of a plurality of BWP combinations, PDSCH receiving occasion sets corresponding to the plurality of BWP combinations in a K1 value set; or the processing unit 520 is further configured to: obtain, based on frequency domain positions of a plurality of BWP combinations, a first PDSCH receiving occasion set corresponding to the plurality of BWP combinations, obtain, based on parameters corresponding to the plurality of BWP combinations, a second PDSCH receiving occasion set corresponding to the plurality of BWP combinations, and determine, based on a combination of the first PDSCH receiving occasion set and the second PDSCH receiving occasion set, PDSCH receiving occasion sets corresponding to the plurality of BWP combinations.

The K1 value set is any one of the following: a K1 value set corresponding to at least one active BWP in the plurality of BWP combinations, a K1 value set corresponding to at least one of the plurality of BWP combinations, and a predefined K1 value set.

The processing unit 520 is specifically configured to generate the HARQ information based on the PDSCH receiving occasion sets corresponding to the plurality of BWP combinations.

Optionally, the processing unit 520 is further configured to determine a maximum quantity of BWP combinations in a feedback window.

The processing unit 520 is specifically configured to:

determine, based on the maximum quantity of BWP combinations in the HARQ feedback window, PDSCH receiving occasion sets corresponding to all the BWP combinations; and generate the HARQ information based on the PDSCH receiving occasion sets corresponding to all the BWP combinations.

Optionally, the transceiver unit 510 is further configured to receive a second message sent by the network device, where the second message is used to indicate at least one of the following: a quantity of codewords CWs of the active BWP in the BWP combination, a quantity of code block groups CBGs of the active BWP in the BWP combination, and space bundling indication information. The processing unit 520 is specifically configured to determine a quantity of bits of the second HARQ information based on the second message.

Specifically, the apparatus 500 may correspond to the terminal device in the method for generating HARQ information according to the embodiments of this application. The apparatus 500 may include modules configured to perform the method performed by the terminal device in the method 200 of FIG. 6. In addition, the modules in the apparatus 500 and the foregoing other operations and/or functions are separately used to implement corresponding procedures in the method 200 of FIG. 6. Specifically, the transceiver unit 510 is configured to perform step 210 in the method 200, and the processing unit 520 is configured to perform step 220 in the method 200. A specific process in which each unit performs the foregoing corresponding step is described in detail in the method 200. For brevity, details are not described herein again.

In another possible design, the apparatus 500 may be a network device or a chip disposed in a network device.

In a possible implementation, the transceiver unit 510 may be configured to send a first message to a terminal device, where the first message is used to indicate that there is a bandwidth part BWP combination in a cell, and the BWP combination includes an active BWP. The transceiver unit 510 is further configured to receive HARQ information sent by the terminal device, where the HARQ information is generated by the terminal device based on a parameter corresponding to the BWP combination.

Optionally, at least two active BWPs in the BWP combination are used to transmit a same transport block.

Optionally, a plurality of active BWPs in the BWP combination are located on different carriers of the cell.

Optionally, the HARQ information is a semi-static HARQ codebook, the HARQ information is determined by the terminal device based on a physical downlink shared channel PDSCH receiving occasion set corresponding to the BWP combination, and the PDSCH receiving occasion set corresponding to the BWP combination is determined by the terminal device based on the parameter corresponding to the BWP combination.

Optionally, the parameter corresponding to the BWP combination includes a parameter corresponding to at least one of the plurality of active BWPs, or a predefined parameter.

Optionally, the HARQ information is determined by the terminal device based on PDSCH receiving occasion sets corresponding to the plurality of BWP combinations, and the PDSCH receiving occasion sets corresponding to the plurality of BWP combinations are determined by the terminal device based on any one of the following:

The terminal device obtains a quantity of frequency domain positions of a plurality of BWP combinations based on a slot timing value K1 value set, and determines all PDSCH receiving occasion sets corresponding to the plurality of BWP combinations; or the terminal device obtains a K1 value set based on frequency domain positions of a plurality of BWP combinations, and determines PDSCH receiving occasion sets corresponding to the plurality of BWP combinations; or the terminal device obtains, based on frequency domain positions of a plurality of BWP combinations, a first PDSCH receiving occasion set corresponding to the plurality of BWP combinations, obtains, based on parameters corresponding to the plurality of BWP combinations, a second PDSCH receiving occasion set corresponding to the plurality of BWP combinations, and the terminal device determines, based on a combination of the first PDSCH receiving occasion set and the second PDSCH receiving occasion set, PDSCH receiving occasion sets corresponding to the plurality of BWP combinations, where the K1 value set is any one of the following: a K1 value set corresponding to at least one active BWP in the plurality of BWP combinations, a K1 value set corresponding to at least one of the plurality of BWP combinations, and a predefined K1 value set.

Optionally, the transceiver unit 510 is further configured to send a second message to the terminal device, where the second message is used to indicate at least one of the following: a quantity of codewords CWs of the active BWP in the BWP combination, a quantity of code block groups CBGs of the active BWP in the BWP combination, and space bundling indication information.

Specifically, the apparatus 500 may correspond to the network device in the method for generating HARQ information according to the embodiments of this application. The apparatus 500 may include modules configured to perform the method performed by the network device in the method 200 of FIG. 6. In addition, the modules in the apparatus 500 and the foregoing other operations and/or functions are separately used to implement corresponding procedures in the method 200 of FIG. 6. Specifically, the transceiver unit 510 is configured to perform step 210 in the method 200. A specific process in which each unit performs the foregoing corresponding step is described in detail in the method 200. For brevity, details are not described herein again.

Figure 16:
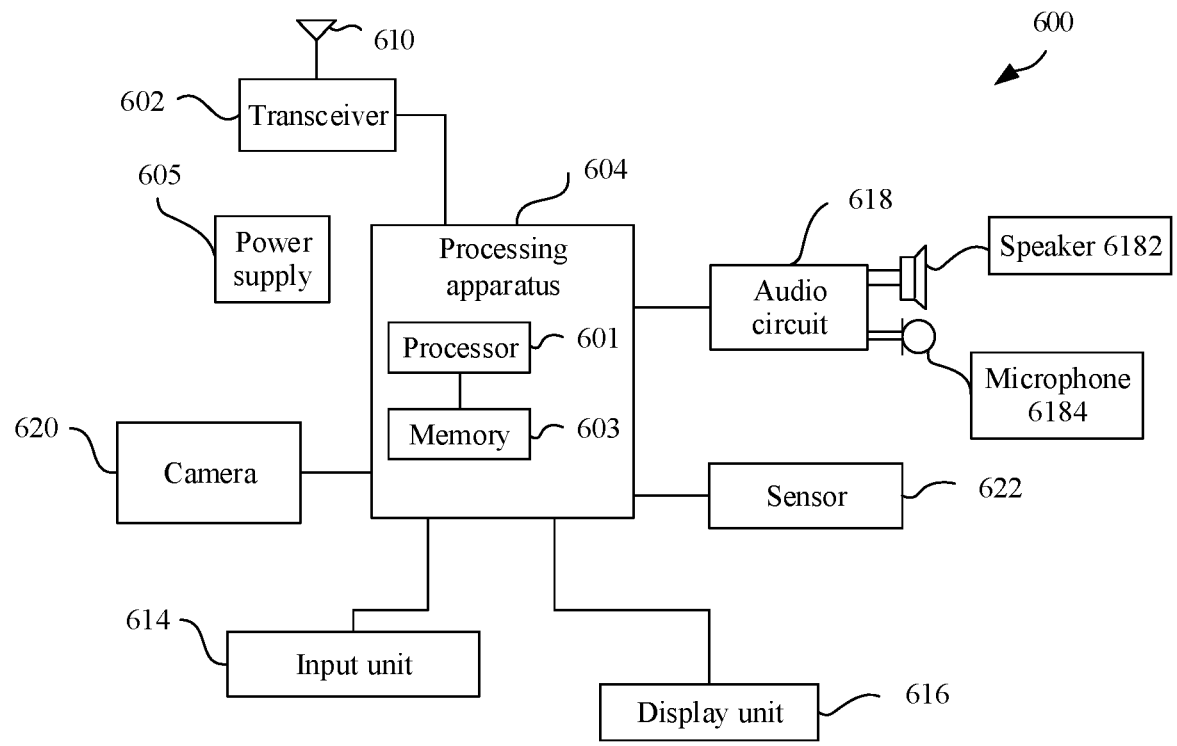
FIG. 16 is a schematic structural diagram of a terminal device according to an embodiment of this application.

FIG. 16 is a schematic structural diagram of a terminal device 600 according to an embodiment of this application. As shown in FIG. 16, the terminal device 600 includes a processor 601 and a transceiver 602, and optionally, the terminal device 600 further includes a memory 603. The processor 601, the transceiver 602, and the memory 603 communicate with each other by using an internal connection path, to transfer a control signal and/or a data signal. The memory 603 is configured to store a computer program. The processor 601 is configured to: invoke the computer program from the memory 603 and run the computer program, to control the transceiver 602 to receive/send a signal.

Optionally, the transceiver 602 may alternatively be a communications interface, configured to receive or send information, a signal, data, and the like that are necessary for communication. For example, the communications interface may be an element that has receiving and sending functions, for example, a transmitter (transmitter) or a receiver (receiver). Alternatively, the communications interface may communicate with another device by using the element that has the receiving and sending functions. The element that has the receiving and sending functions may be implemented by an antenna and/or a radio frequency apparatus.

The processor 601 and the memory 603 may be integrated into one processing apparatus 604. The processor 601 is configured to execute program code stored in the memory 603 to implement the foregoing functions. During specific implementation, the memory 603 may alternatively be integrated into the processor 601, or may be independent of the processor 601. The terminal device 600 may further include an antenna 610, configured to send, by using a radio signal, uplink data or uplink control signaling output by the transceiver 602.

Specifically, the terminal device 600 may correspond to the terminal device in the method 200 according to the embodiments of this application. The terminal device 600 may include modules configured to perform the method performed by the terminal device in the method 200 of FIG. 6. In addition, the modules in the terminal device 600 and the foregoing other operations and/or functions are separately used to implement corresponding procedures in the method 200 of FIG. 6. Specifically, the memory 603 is configured to store the program code, so that when executing the program code, the processor 601 performs step 220 in the method 200, and controls the transceiver 602 to perform step 210 in the method 200. A specific process in which each module performs the foregoing corresponding step is described in detail in the method 200. For brevity, details are not described herein again.

The processor 601 may be configured to perform an action internally implemented by the terminal in the foregoing method embodiment, and the transceiver 602 may be configured to perform a transmitting action or a sending action by the terminal to the network device in the foregoing method embodiment. For details, refer to the descriptions in the foregoing method embodiment. Details are not described herein again.

The processor 601 and the memory 603 may be integrated into one processing apparatus. The processor 601 is configured to execute the program code stored in the memory 603 to implement the foregoing functions. During specific implementation, the memory 603 may alternatively be integrated into the processor 601.

The terminal device 600 may further include a power supply 605, configured to supply power to various components or circuits in the terminal.

In addition, to make functions of the terminal device more perfect, the terminal device 600 may further include one or more of an input unit 614, a display unit 616, an audio circuit 618, a camera 620, a sensor 622, and the like, and the audio circuit may further include a speaker 6182, a microphone 6184, and the like.

Figure 17:
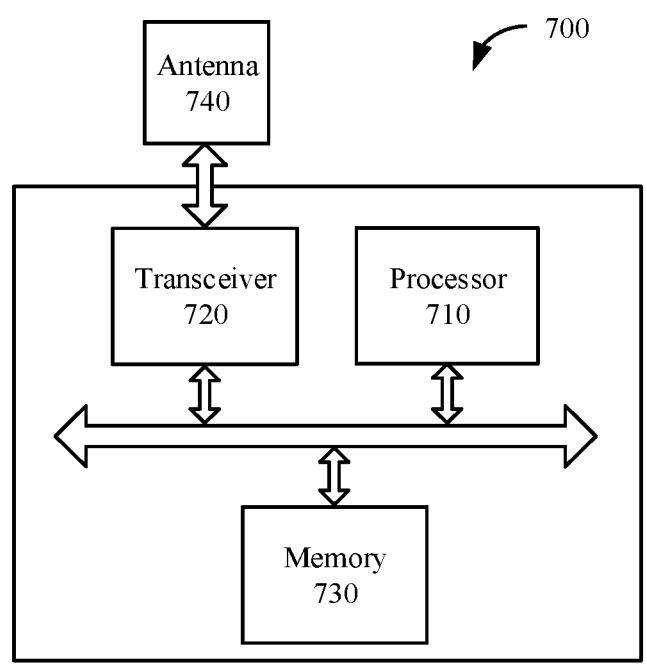
FIG. 17 is a schematic structural diagram of a network device according to an embodiment of this application.

FIG. 17 is a schematic structural diagram of a network device 700 according to an embodiment of this application. As shown in FIG. 17, the network device 700 includes a processor 710 and a transceiver 720. Optionally, the network device 700 may further include a memory 730. The processor 710, the transceiver 720, and the memory 730 communicate with each other by using an internal connection path, to transfer a control signal and/or a data signal. The memory 730 is configured to store a computer program. The processor 710 is configured to: invoke the computer program from the memory 730 and run the computer program, to control the transceiver 720 to receive/send a signal.

Optionally, the transceiver 720 may alternatively be a communications interface, configured to receive or send information, a signal, data, and the like that are necessary for communication. For example, the communications interface may be an element that has receiving and sending functions, for example, a transmitter (transmitter) or a receiver (receiver). Alternatively, the communications interface may communicate with another device by using the element that has the receiving and sending functions. The element that has the receiving and sending functions may be implemented by an antenna and/or a radio frequency apparatus.

The processor 710 and the memory 730 may be integrated into one processing apparatus. The processor 710 is configured to execute program code stored in the memory 730 to implement the foregoing functions. During specific implementation, the memory 730 may alternatively be integrated into the processor 710, or may be independent of the processor 710.

The network device may further include an antenna 740, configured to send, by using a radio signal, downlink data or downlink control signaling output by the transceiver 720.

Specifically, the network device 700 may correspond to the network device in the method 200 for generating HARQ information according to the embodiments of this application. The network device 700 may include modules configured to perform the method performed by the network device in the method 200 of FIG. 6. In addition, the modules in the network device 700 and the foregoing other operations and/or functions are separately used to implement corresponding procedures in the method 200 of FIG. 6. Specifically, the memory 730 is configured to store the program code, so that when executing the program code, the processor 710 controls the transceiver 720 to perform step 210 in the method 200 by using the antenna 740. A specific process in which each module performs the foregoing corresponding step is described in detail in the method 200. For brevity, details are not described herein again.

It should be understood that, the processor in this embodiment of this application may be a central processing unit (central processing unit, CPU), or the processor may be another general-purpose processor, a digital signal processor (digital signal processor, DSP), an application-specific integrated circuit (application specific integrated circuit, ASIC), a field programmable gate array (field programmable gate array, FPGA), another programmable logic device, a discrete gate, a transistor logic device, a discrete hardware component, or the like. The general-purpose processor may be a microprocessor, or the processor may be any conventional processor or the like.

It should be further understood that the memory in this embodiment of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of random access memories (random access memory, RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

According to the method provided in the embodiments of this application, this application further provides a computer program product. The computer program product includes computer program code; and when the computer program code is run on a computer, the computer is enabled to perform the methods in the foregoing embodiments.

According to the method provided in the embodiments of this application, this application further provides a computer-readable medium. The computer-readable medium stores program code; and when the program code is run on a computer, the computer is enabled to perform the methods in the foregoing embodiments.

According to the method provided in the embodiments of this application, this application further provides a system, including the foregoing network device and one or more terminal devices. All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions. When the computer program instructions are loaded or executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. A part or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for generating hybrid automatic repeat request (HARQ) information, comprising:
    receiving, by a terminal device, a first message sent by a network device, wherein the first message indicates that there is a bandwidth part (BWP) combination in a cell, and the BWP combination comprises at least two active BWPs that are used to transmit a same transport block on a downlink (DL); and
    generating, by the terminal device, HARQ information based on a parameter corresponding to the BWP combination.

2. The method according to claim 1, wherein a plurality of active BWPs in the BWP combination are located on different carriers of the cell.

3. The method according to claim 1, wherein the generating, by the terminal device, the HARQ information based on a parameter corresponding to the BWP combination comprises:
    determining, by the terminal device based on the parameter corresponding to the BWP combination, a physical downlink shared channel (PDSCH) receiving occasion set corresponding to the BWP combination; and
    generating, by the terminal device, the HARQ information based on the PDSCH receiving occasion set corresponding to the BWP combination.

4. The method according to claim 1, wherein the parameter corresponding to the BWP combination comprises:

a parameter corresponding to at least one of a plurality of active BWPs in the BWP combination, or a predefined parameter.

5. The method according to claim 1, wherein the method further comprises:
obtaining, by the terminal device, a quantity of frequency domain positions of a plurality of BWP combinations based on a slot timing value K1 value set, determining PDSCH receiving occasion sets corresponding to the plurality of BWP combinations for each K1 value, and determining all PDSCH receiving occasion sets corresponding to the plurality of BWP combinations for all K1 values in the K1 value set; or obtaining, by the terminal device, a K1 value set based on frequency domain positions of a plurality of BWP combinations, determining a PDSCH receiving occasion set corresponding to a frequency domain position of each BWP combination in the K1 value set, and determining PDSCH receiving occasion sets corresponding to the plurality of BWP combinations; or obtaining, by the terminal device based on frequency domain positions of a plurality of BWP combinations, a first PDSCH receiving occasion set corresponding to the plurality of BWP combinations, obtaining, based on parameters corresponding to the plurality of BWP combinations, a second PDSCH receiving occasion set corresponding to the plurality of BWP combinations, and determining, by the terminal device based on a combination of the first PDSCH receiving occasion set and the second PDSCH receiving occasion set, PDSCH receiving occasion sets corresponding to the plurality of BWP combinations, wherein the K1 value set is one of the following: a K1 value set corresponding to at least one active BWP in the plurality of BWP combinations, a K1 value set corresponding to at least one of the plurality of BWP combinations, or a predefined K1 value set; and the generating, by the terminal device, HARQ information based on a parameter corresponding to the BWP combination comprises:

generating, by the terminal device, the HARQ information based on the PDSCH receiving occasion sets corresponding to the plurality of BWP combinations.

6. The method according to claim 1, wherein the method further comprises:
determining, by the terminal device, a maximum quantity of BWP combinations in a feedback window; and
the generating, by the terminal device, HARQ information based on a parameter corresponding to the BWP combination comprises:
determining, by the terminal device based on the maximum quantity of BWP combinations in the feedback window, PDSCH receiving occasion sets corresponding to all the BWP combinations; and
generating, by the terminal device, the HARQ information based on the PDSCH receiving occasion sets corresponding to all the BWP combinations.

7. A method for generating hybrid automatic repeat request (HARQ) information, comprising:
sending, by a network device, a first message to a terminal device, wherein the first message indicates that there is a bandwidth part (BWP) combination in a cell, and the BWP combination comprises at least two active BWPs that are used to transmit a same transport block on a downlink (DL); and
receiving, by the network device, HARQ information sent by the terminal device.

8. The method according to claim 7, wherein a plurality of active BWPs in the BWP combination are located on different carriers of the cell.

9. The method according to claim 7, wherein the HARQ information corresponds to a physical downlink shared channel (PDSCH) receiving occasion set indicated by the BWP combination.

10. An apparatus comprising:
a receiver;
at least one processor; and
one or more memories coupled to the at least one processor and storing programming instructions for execution by the at least one processor to cause the apparatus to:
receive, by using the receiver, a first message sent by a network device, wherein the first message indicates that there is a bandwidth part (BWP) combination in a cell, and the BWP combination comprises at least two active BWPs that are used to transmit a same transport block on a downlink (DL); and
generate hybrid automatic repeat request (HARD) information based on a parameter corresponding to the BWP combination.

11. The apparatus according to claim 10, wherein a plurality of active BWPs in the BWP combination are located on different carriers of the cell.

12. The apparatus according to claim 10, wherein the processor is further configured to:
determine, based on the parameter corresponding to the BWP combination, a physical downlink shared channel (PDSCH) receiving occasion set corresponding to the BWP combination; and
generate the HARQ information based on the PDSCH receiving occasion set corresponding to the BWP combination.

13. The apparatus according to claim 10, wherein the parameter corresponding to the BWP combination comprises:
a parameter corresponding to at least one of a plurality of active BWPs in the BWP combination, or a predefined parameter.

14. The apparatus according to claim 10, wherein the receiver is further configured to:
obtain a quantity of frequency domain positions of a plurality of BWP combinations based on a slot timing value K1 value set, determine PDSCH receiving occasion sets corresponding to the plurality of BWP combinations for each K1 value, and determine all PDSCH receiving occasion sets corresponding to the plurality of BWP combinations for all K1 values in the K1 value set; or obtain a K1 value set based on frequency domain positions of a plurality of BWP combinations, determine a PDSCH receiving occasion set corresponding to a frequency domain position of each BWP combination in the K1 value set, and determine PDSCH receiving occasion sets corresponding to the plurality of BWP combinations; or obtain, based on frequency domain positions of a plurality of BWP combinations, a first PDSCH receiving occasion set corresponding to the plurality of BWP combinations, obtain, based on parameters corresponding to the plurality of BWP combinations, a second PDSCH receiving occasion set corresponding to the plurality of BWP combinations, and determine based on a combination of the first PDSCH receiving occasion set and the second PDSCH receiving occasion set, PDSCH receiving occasion sets corresponding to the plurality of BWP combinations, wherein the K1 value set is one of the following: a K1 value set corresponding to at least one active BWP in the plurality of BWP combinations, a K1 value set corresponding to at least one of the plurality of BWP combinations, or a predefined K1 value set; and the processor is further configured to generate the HARQ information based on the PDSCH receiving occasion sets corresponding to the plurality of BWP combinations.

15. The apparatus according to claim 10, wherein the processor is further configured to:

determine a maximum quantity of BWP combinations in a feedback window; and determine based on the maximum quantity of BWP combinations in the feedback window, PDSCH receiving occasion sets corresponding to all the BWP combinations; and generate the HARQ information based on the PDSCH receiving occasion sets corresponding to all the BWP combinations.

16. An apparatus comprising:
a transmitter;
a receiver;
at least one processor; and
one or more memories coupled to the at least one processor and storing programming instructions for execution by the at least one processor to cause the apparatus to:

send, by using the transmitter, a first message to a terminal device, wherein the first message indicates that there is a bandwidth part (BWP) combination in a cell, and the BWP combination comprises at least two active BWPs that are used to transmit a same transport block on a downlink (DL); and receive, by using the receiver, HARQ information sent by the terminal device.

17. The apparatus according to claim 16, wherein a plurality of active BWPs in the BWP combination are located on different carriers of the cell.

18. The apparatus according to claim 16, wherein the HARQ information corresponds to a physical downlink shared channel (PDSCH) receiving occasion set indicated by the BWP combination.

* * * * *

UNITED STATES PATENT AND TRADEMARK OFFICE
CERTIFICATE OF CORRECTION

| | |
|---|---|
| PATENT NO. | : 11,843,462 B2 |
| APPLICATION NO. | : 17/129397 |
| DATED | : December 12, 2023 |
| INVENTOR(S) | : Jiehua Xiao, Jinlin Peng and Zhenfei Tang |

It is certified that error appears in the above-identified patent and that said Letters Patent is hereby corrected as shown below:

In the Claims

Column 38, Line 21, Claim 10, please delete "(HARD)" and insert therefore -- (HARQ) --.

Signed and Sealed this
Fourth Day of June, 2024

Katherine Kelly Vidal
*Director of the United States Patent and Trademark Office*